(12) United States Patent
Turner

(10) Patent No.: US 12,217,517 B1
(45) Date of Patent: Feb. 4, 2025

(54) APPARATUS AND METHOD FOR VEHICLE DATA ANALYSIS

(71) Applicant: EmergIP, LLC, Dover, DE (US)

(72) Inventor: Christopher Turner, Dover, DE (US)

( * ) Notice: Subject to any disclaimer, the term of this patent is extended or adjusted under 35 U.S.C. 154(b) by 0 days.

(21) Appl. No.: 18/236,634

(22) Filed: Aug. 22, 2023

(51) Int. Cl.
*G06V 20/59* (2022.01)
*G06N 3/08* (2023.01)
*G06V 10/764* (2022.01)
*G07C 5/00* (2006.01)

(52) U.S. Cl.
CPC ............ *G06V 20/593* (2022.01); *G06N 3/08* (2013.01); *G06V 10/764* (2022.01); *G07C 5/008* (2013.01)

(58) Field of Classification Search
CPC ...... G06V 20/593; G06V 10/764; G06N 3/08; G07C 5/008
USPC .......................................................... 701/1
See application file for complete search history.

(56) References Cited

U.S. PATENT DOCUMENTS

| | | | |
|---|---|---|---|
| 9,237,243 B2 | 1/2016 | Jensen | |
| 10,872,381 B1* | 12/2020 | Leise | .................. H04W 12/009 |
| 11,109,816 B2 | 9/2021 | Martin | |
| 2018/0144369 A1* | 5/2018 | Pouliot | ............ B60W 30/0953 |
| 2019/0197414 A1* | 6/2019 | Zerick | ................... G16H 10/60 |
| 2022/0344014 A1 | 10/2022 | Kim | |

* cited by examiner

*Primary Examiner* — Tyler D Paige
(74) *Attorney, Agent, or Firm* — Caldwell Intellectual Property Law

(57) ABSTRACT

Apparatus and method for vehicle data analysis. The apparatus includes at least a processor and a memory communicatively connected to the at least a processor, wherein the memory includes instructions configuring the at least a processor to receive vehicle data from one or more data sources, wherein the vehicle data includes location information that is received from at least a sensor of the one or more data sources and passenger information, classify the vehicle data into one or more vehicle groups, wherein the one or more vehicle groups includes a location group and passenger group, analyze the location group of the one or more vehicle groups to generate a location list, analyze the one or more vehicle groups to generate a passenger list, generate a location report as a function of the location list and generate a passenger report as a function of the passenger list.

14 Claims, 8 Drawing Sheets

APPARATUS AND METHOD FOR VEHICLE DATA ANALYSIS

FIELD OF THE INVENTION

The present invention generally relates to the field of data analysis. In particular, the present invention is directed to apparatus and method for vehicle data analysis.

BACKGROUND

Evaluation of vehicle data in real time can be difficult. Existing technologies do not adequately utilize data processing to leverage existing reference data in order to provide evaluations of vehicle data.

SUMMARY OF THE DISCLOSURE

In an aspect, an apparatus for vehicle data analysis is disclosed. The apparatus includes at least a processor and a memory communicatively connected to the at least a processor, wherein the memory includes instructions configuring the at least a processor to receive vehicle data from one or more data sources, wherein the vehicle data includes location information, wherein the location information is received from at least a sensor of the one or more data sources and passenger information, classify the vehicle data into one or more vehicle groups, wherein the one or more vehicle groups includes a location group and passenger group, analyze the location group of the one or more vehicle groups to generate a location list, analyze the one or more vehicle groups to generate a passenger list, generate a location report as a function of the location list and generate a passenger report as a function of the passenger list.

In another aspect, a method for vehicle data analysis is disclosed. The method includes receiving, using at least a processor, vehicle data from one or more data sources, wherein the vehicle data includes location information, wherein the location information is received from at least a sensor of the one or more data sources and passenger information, classifying, using the at least a processor, the vehicle data into one or more vehicle groups, wherein the one or more vehicle groups includes a location group and passenger group, analyzing, using the at least a processor, the location group of the one or more vehicle groups to generate a location list, analyzing, using the at least a processor, the one or more vehicle groups to generate a passenger list, generating, using the at least a processor, a location report as a function of the location list and generating, using the at least a processor, a passenger report as a function of the passenger list.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for vehicle data analysis is disclosed. The apparatus includes at least a processor and a memory communicatively connected to the at least a processor, wherein the memory includes instructions configuring the at least a processor to receive vehicle data from one or more data sources, wherein the vehicle data includes location information, wherein the location information is received from at least a sensor of the one or more data sources and passenger information, classify the vehicle data into one or more vehicle groups, wherein the one or more vehicle groups includes a location group and passenger group, analyze the location group of the one or more vehicle groups to generate a location list, analyze the one or more vehicle groups to generate a passenger list, generate a location report as a function of the location list and generate a passenger report as a function of the passenger list. Exemplary embodiments illustrating aspects of the present disclosure are described below in the context of several specific examples.

Figure 1:
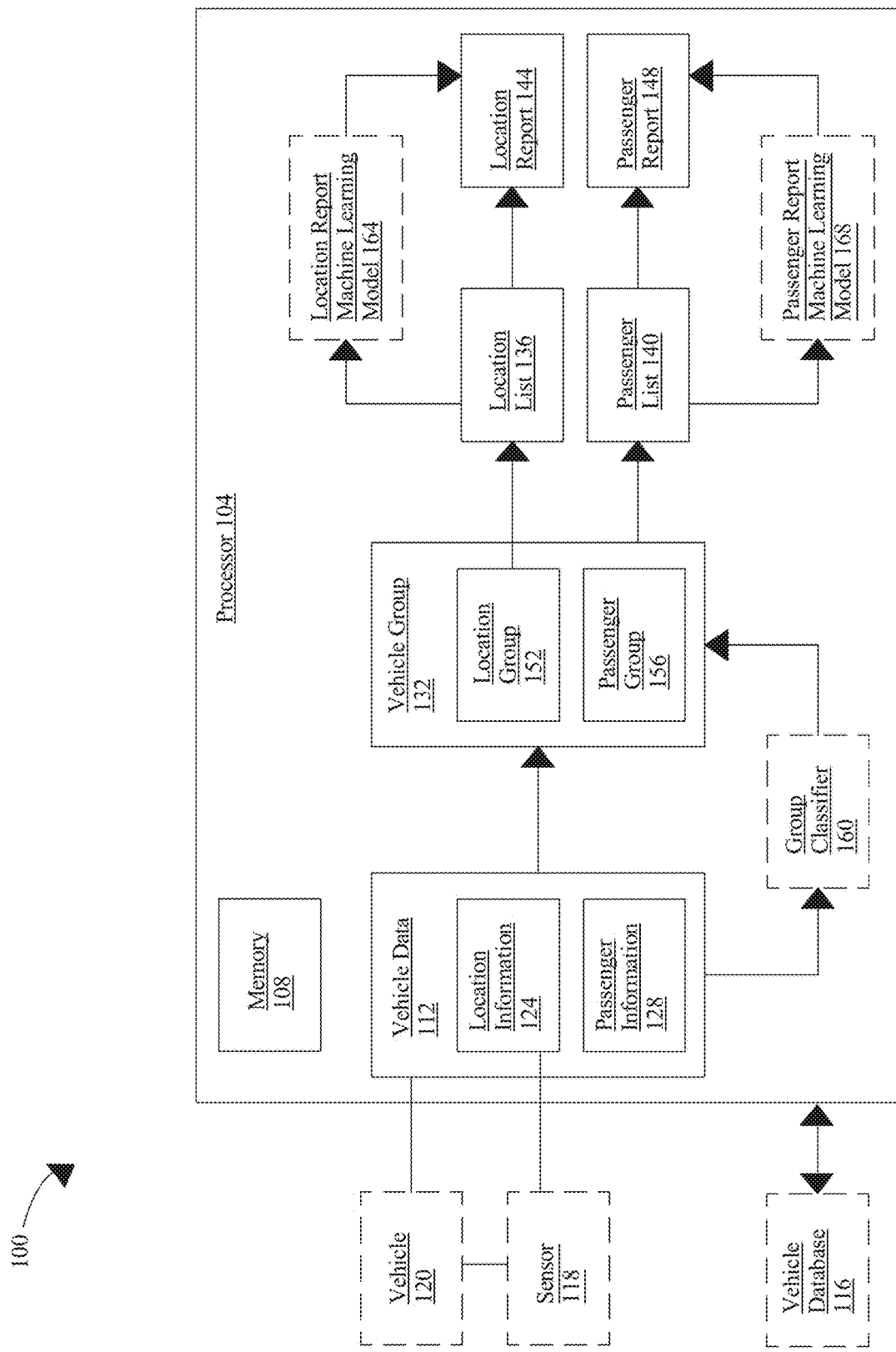
FIG. 1 illustrates a block diagram of exemplary apparatus of vehicle data analysis.

Referring now to FIG. 1, an exemplary embodiment of an apparatus 100 for vehicle data analysis is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive vehicle data 112 from one or more data sources. For the purposes of this disclosure, "vehicle data" is data related to a vehicle and a passenger of the vehicle. In some embodiments, vehicle data 112 may be stored in a vehicle database 116. In some embodiments, vehicle data 112 may be retrieved from vehicle database 116. Vehicle database 116 disclosed herein is further described below. For the purposes of this disclosure, a "vehicle" is any means in or by which someone or something may be transported. As a non-limiting example, vehicle 120 may include a car, truck, bus, motorcycle, bicycle, watercraft, aircraft, and the like. As another non-limiting example, vehicle may include emergency medical service (EMS) vehicle, law enforcement vehicle, fire engine, or the like. For the purposes of this disclosure, a "passenger" is an individual who is in a vehicle getting transported. In some embodiments, passenger may include a plurality of passengers. As a non-limiting example, passenger may include a subject, such as but not limited to a patient, criminal, or the like. As another non-limiting example, passenger may include an authorized personnel, such as but not limited to a paramedic, emergency medical technicians (EMTs), police officer, state trooper, federal agent, fire fighter, or the like.

With continued reference to FIG. 1, in some embodiments, vehicle data 112 may include location information. For the purposes of this disclosure, "location information" is information related to a destination of a vehicle. As a non-limiting example, location information may include an address of vehicle 120's destination. As a non-limiting example, one address of location information 124 may indicate one trip vehicle 120 made to a destination. As another non-limiting example, a plurality of address of location information 124 may indicate a plurality of trips vehicle 120 made to a destination. For example, and without limitation, destination of vehicle 120 may include a location where an accident occurred. The accident disclosed herein is further described below. For example, and without limitation, location address may include a name and number of street, name and/or number of a building, city, state, country and zone improvement plan (zip) code. For example, and without limitation, location address of the Empire State Building may include 20 W 34th St., New York, NY 10001. As another non-limiting example, location address may include a global positioning system (GPS) coordinate. For the purposes of this disclosure, a "global positioning system coordinate" is a unique identifier of a precise geographic location on the earth. "Coordinates," in this context, are points of intersection in a grid system. As a non-limiting example, GPS coordinates may include the combination of latitude and longitude. Lines of latitude coordinates measure degrees of distance north and south from the equator, which is 0 degrees. The north pole and south pole are at 90 degrees in either direction. The prime meridian, located in Greenwich, UK, is 0 degrees longitude, and the lines of longitude coordinates are measured according to 90 degrees east and west from that point. In an embodiment, the GPS coordinate may include alphanumeric characters. As a non-limiting example, alphanumeric characters of the GPS coordinate of the Empire State Building in New York City may include N40° 44.9064', W073° 59.0735'. In another embodiment, alternatively, the GPS coordinate may include a numeric format. As a non-limiting example, a numeric format of the GPS coordinate of the Empire State Building in New York City may include 40.748440, −73.984559. In the numeric format, the minus sign before the second number indicates that the location is west of the prime meridian; a minus sign in front of the first number would indicate degrees south of the equator.

With continued reference to FIG. 1, in an embodiment, location information may include accident information. For the purposes of this disclosure, "accident information" is information related to accident occurred at a destination of a vehicle. For the purposes of this disclosure, "accident" is an event that causes damage, injury, or harm to people, property, or the environment. In some embodiments, each destination may include accident information. As a non-limiting example, accident may include a traffic accident, occupational accident, home accident, sports accident, recreational accident, public space accident, natural disaster, or the like. As another non-limiting example, accident may include traffic offenses, homicide, assault, robbery, domestic violence, burglary, theft, or the like. In some embodiments, accident information may include accident time. As a non-limiting example, accident time may include date and time when accident took place. For example, and without limitation, accident time may include year, month, day, hour, minute, second when accident took place. In some embodiments, accident information may include an accident type. As a non-limiting example, accident type may include a traffic accident, occupational accident, home accident, sports accident, recreational accident, public space accident, natural disaster, traffic offenses, homicide, assault, robbery, domestic violence, burglary, theft, or the like. In some embodiments, accident information may include a contributing factor that played a role in causing an accident. As a non-limiting example, contributing factor may include driver error, weather conditions, road conditions, mechanical failures, drug abuse, alcohol abuse, or other external influences. As another non-limiting example, contributing factor may include road conditions that includes narrow lanes, extreme curve, unclear signage, short traffic signal timing, poor visibility, poor road conditions, complex intersection, poor engineered lanes, or the like. In some embodiments, accident information may include an accident consequence. For the purposes of this disclosure, an "accident consequence" is an outcome that arise as an effect of an accident. For example, and without limitation, accident consequence may include human injury, human fatality, property damage, environmental impact, or the like.

With continued reference to FIG. 1, in some embodiments, vehicle data 112 may include passenger information 128. For the purposes of this disclosure, "passenger information" is information related to a passenger of a vehicle. As a non-limiting example, passenger information 128 may include age, gender, date of birth, name, residency, religion, organ donation status, occupation, injury history, medical history, contact information, family or support person information, and the like. In some embodiments, passenger information may include billing information. For the purposes of this disclosure, "billing information" is information of a subject's payment method. As a non-limiting example, billing information may include payment method preference, payment history, credit card information, debit card information, and the like. For the purposes of this disclosure, "card information" is information related to subject's card that can make a payment. As a non-limiting example, the card information may include card numbers, card security codes, subject's personal identification number (PIN) for the card, the card's expiration date, and the subject's name on the card, and the like. As another non-limiting example, passenger information 128 may include the total fee that passenger paid for injury care after accident management covered the fee (paid fee). For example, and without limitation, the total fee passenger paid for injury care may include $0, 5, 30, 100, 3000, 12000, or the like.

With continued reference to FIG. 1, in an embodiment, passenger information 128 may include injury information. For the purposes of this disclosure, "injury information" is information related to an injury of a passenger from an accident. As a non-limiting example, injury information may include an injury type. For example, and without limitation, injury type may include cardiovascular injury, neurological injury, respiratory injury, orthopedic injury, dermal injury, eye injury, ear injury, gastrointestinal injury, renal injury urinary injury, reproductive system injury, psychological injury, or the like. For example, and without limitation, injury type may include a detailed type of injury, such as but not limited to heart attack, cardiac arrhythmias, stroke, spinal cord injury, pneumothorax, fracture, dislocation, sprain, burn, skin injection, allergic reaction, or the like.

With continued reference to FIG. 1, in another embodiment, passenger information 128 may include injury care information. For the purposes of this disclosure, "injury care information" is information related to any treatment or management system that is utilized to treat an injury of a subject. As a non-limiting example, injury care information may include medical treatment, rehabilitation, pain management, or the like. As a non-limiting example, injury care information May include a detailed type of injury care such as but not limited to dressing wounds, medication prescription, cardiac surgery, fracture fixation, joint replacement, physical therapy, intubation, or the like. As another non-limiting example, injury care information may include the total amount of fee that was charged to passenger for injury care (charged fee). For example, and without limitation, the total fee charged to passenger for injury care may include $5, 30, 100, 3000, 12000, or the like.

With continued reference to FIG. 1, in some embodiments, passenger information 128 may include accident management information. For the purposes of this disclosure, "accident management information" is information related to financial management of a subject for dealing an accident or injury resulted by the accident. For the purposes of this disclosure, an "accident management" is an individual, group or entity that provides financial protection to a subject. As a non-limiting example, accident management may include health insurance, life insurance, auto insurance, homeowners' insurance, renters' insurance, property insurance, or the like. As another non-limiting example, accident management information may include a name of subject's insurance company, policy number, effective dates, coverage limits, deductibles, coverage types, frequency of payment, payment method, claims process, policy limitation, policy exclusion, insurance provider contact information, or the like. As another non-limiting example, accident management information may include the total amount of fee covered by accident management for passenger's injury care (covered fee). For example, and without limitation, the total fee covered by accident management for injury care may include $0, 5, 30, 100, 3000, 12000, or the like.

With continued reference to FIG. 1, in some embodiments, processor 104 may retrieve vehicle data 112 from vehicle database 116. In some embodiments, apparatus 100 may include vehicle database 116. As used in this disclosure, "vehicle database" is a data structure configured to store data associated with a vehicle. As a non-limiting example, vehicle database 116 may store vehicle data 112, one or more vehicle groups 132, location list 136, passenger list 140, location report 144, passenger report 148, and the like. In one or more embodiments, vehicle database 116 may include input or calculated information and datum related to vehicle 120 and passenger. In some embodiments, a datum history may be stored in vehicle database 116. As a non-limiting example, the datum history may include real-time and/or previous inputted data related to vehicle 120, such as but not limited to vehicle data 112, one or more vehicle groups 132, location list 136, passenger list 140, location report 144, passenger report 148, and the like. As a non-limiting example, vehicle database 116 may include instructions from a user, who may be an expert user, a past user in embodiments disclosed herein, or the like, where the instructions may include examples of the data related to vehicle 120. For the purposes of this disclosure, a "user" is any individual, group, company or entity that is using or has used apparatus 100. As a non-limiting example, user may include an information requester. For the purposes of this disclosure, an "information requester" is an individual, group or entity that is requesting information related to a vehicle or its passenger. For example, and without limitation, information requester may include a traffic engineer, city manager, city hall, local representative, city council member, county commissioner, government, insurance company, policy maker, stakeholder, or the like. As another non-limiting example, user may include a data provider. For the purposes of this disclosure, a "data provider" is an individual, group or entity that provides information related to a vehicle or its passenger to processor 104. For example, and without limitation, data provider may include a dispatcher, technician, administrator, hospital personnel, authorized personnel of passenger, or the like. For the purposes of this disclosure, a "dispatcher" is an individual or a central communication system responsible for receiving and transmitting information, coordinating activities and allocating resources.

With continued reference to FIG. 1, in some embodiments, processor 104 may be communicatively connected with vehicle database 116. For example, and without limitation, in some cases, vehicle database 116 may be local to processor 104. In another example, and without limitation, vehicle database 116 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure at least a processor 104 connect directly, dynamically, and non-hierarchically to as many other computing devices as possible. A "network topology" as used in this disclosure is an arrangement of elements of a communication network. The network may use an immutable sequential listing to securely store vehicle database 116. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, vehicle database 116 may include keywords. As used in this disclosure, a "keyword" is an element of word or syntax used to identify and/or match elements to each other. For example, without limitation, keyword may include "accident type" in the instance that user is looking for information related to a specific type of accident. In another non-limiting example, keyword may include "address" in the instance that user is looking for information related to a specific location.

With continued reference to FIG. 1, in some embodiments, vehicle database 116 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, processor 104 is configured to receive location information of vehicle data 112 from at least a sensor 118. For the purposes of this disclosure, a "sensor" is a device that produces an output signal for the purpose of sensing a physical phenomenon. As a non-limiting example, sensor 118 may include a global positioning system (GPS) sensor. For the purposes of this disclosure, a "global positioning system sensor" is a device that receives signals from satellites to determine the precise location, velocity, and time information of the receiver's position on the Earth's surface. In some embodiments, sensor 118 may be fixed on vehicle 120. In some embodiments, any signals or data generated from sensor may be stored in vehicle database 116. In some embodiments, sensor 118 may include implementation of navigation application programming interface (API). In some embodiments, location information 124 of vehicle data 112 may be obtained using a navigation (API). As a non-limiting example, the navigation API may include GOOGLE MAPS application programing interfaces (APIs) or any other digital map APIs. In a non-limiting example, at least a processor 104 may be configured to call APIs for location or address retrieval (location information of vehicle data 112). Processor 104 may be further configured to convert a location retrieved through the APIs for location retrieval into a coordinate using Geocoding APIs, compare the coordinate to the check point coordinate, and calculate a coordinate difference, wherein the coordinate difference is an evaluation of the distance between converted coordinate and the check point coordinate. In some embodiments, location information of vehicle data 112 may be obtained using any geolocation techniques such as geofencing, GPS, IP address geolocation, and the like. As used in this disclosure, a "geofence" is a virtual perimeter for a real-word geographic area. In some cases, geofence may be dynamically generated/determined as in a radius around a point location, or match a predefined set of boundaries such as, without limitation, school zones, business zones, factory zones, neighborhood boundaries, and the like thereof.

With continued reference to FIG. 1, in some embodiments, processor 104 may obtain vehicle data 112 using optical character recognition (OCR). In some embodiments, processor 104 may analyze a document using OCR to find vehicle data 112. As a non-limiting example, document may include a police report, fire department report, EMS report, medical report, call record, or the like. For the purposes of this disclosure, a "call record" is a documented record of a communication event made or received through a telecommunications system. In some embodiments, call record may include date, time, duration, transmitted messages and phone numbers involved in a call. As a non-limiting example, call record may include a record of a call between data provider of user and authorized personnel of passenger. For example, and without limitation, call record may include a call between hospital personnel and EMT. For example, and without limitation, call record may include a call between dispatcher and EMT. For example, and without limitation, call record may include a call between dispatcher and police officer. In some embodiments, call record may include radio record. For the purposes of this disclosure, a "radio record" is a documented record or log of radio communications that have taken place over a specific radio frequency or channel. As a non-limiting example, radio record may include radio communication between data provider of user and authorized personnel of passenger. For example, and without limitation, radio record may include a call between hospital personnel and EMT. For example, and without limitation, radio record may include radio communication between dispatcher and EMT. For example, and without limitation, radio record may include radio communication between dispatcher and police officer. In some embodiments, document may be obtained from vehicle database 116. In some embodiments, document may be obtained from data provider of user.

With continued reference to FIG. 1, in some embodiments, processor 104 may obtain document using automatic speech recognition (ASR). As a non-limiting example, ASR may analyze a record of a call or radio communication to obtain call record or radio record. For the purposes of this disclosure, an "automatic speech recognition" is a technology that converts spoken language into written text or machine-readable form. In a non-limiting example, processor 104 may use a record of a call or radio communication between dispatcher and EMT to aid in recognition of vehicle data 112. In some embodiments, ASR may include techniques employing language processing to aid speech recognition processes. In some cases, ASR may be used to decode (i.e., recognize) indeterministic phonemes or help in forming a preponderance among probabilistic candidates. In some cases, ASR may include an audio-based automatic speech recognition process and an image-based automatic speech recognition process. ASR may analyze audio according to any method described herein, for instance using a Mel frequency cepstral coefficients (MFCCs) and/or log-Mel spectrogram derived from raw audio samples. In some cases, feature recognition may include any feature recognition process described in this disclosure, for example a variant of a convolutional neural network. In some cases, ASR employs an audio vector to recognize vehicle data 112. For instance, audio vector may each be concatenated and used to predict speech made by data provider of user or authorized personnel of passenger.

With continued reference to FIG. 1, for the purposes of this disclosure, an "optical character recognition" is a technology that enables the recognition and conversion of printed or written text into machine-encoded text. In some cases, processor 104 may be configured to recognize a keyword using the OCR to find vehicle data 112. In some cases, processor 104 may transcribe much or even substantially all document.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from document may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology May be referred to as "online" character recognition, dynamic character recognition, real-time character recognition, and intelligent character recognition.

With continued reference to FIG. 1, in some cases, OCR processes may employ pre-processing of document. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the document to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 2. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes document. Since the adaptive classifier may have learned something useful a little too late to recognize characters on the first pass, a second pass may be run over the document. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules May be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, vehicle data 112 may be obtained from a remote device. For the purposes of this disclosure, a "remote device" is an external device to processor 104. As a non-limiting example, remote device may include a computing device, processor, and the like. As a non-limiting example, user device may include a laptop, tablet, smartphone, phone, smartwatch, desktop, handheld transceiver, or the like. In some embodiments, remote device may transmit a signal, bit, datum, or parameter to processor 104 that at least relates to vehicle data 112. In some embodiments, remote device may include an interface configured to receive inputs from user. As a non-limiting example, data provider of user, such as but not limited to dispatcher, may input vehicle data 112 such as but not limited to location information, passenger information, and the like. In some embodiments, user may have a capability to process, store or transmit any information independently. In some embodiments, data inputted by user may be transmitted to authorized personnel of passenger. As a non-limiting example, EMTs may receive data inputted by user. As another non-limiting example, a dispatcher may call EMTs to transmit vehicle data 112 verbally.

With continued reference to FIG. 1, memory 108 contains instructions configuring processor 104 to classify vehicle data 112 into one or more vehicle groups 132. For the purposes of this disclosure, a "vehicle group" is a set of associative vehicle data. In some embodiments, processor 104 may analyze vehicle data 112 using OCR or language processing model to find a keyword of the vehicle data 112, and the processor 104 may classify the vehicle data 112 to vehicle group 132 that matches with the keyword. In some embodiments, vehicle groups 132 may be stored in vehicle database 116. In some embodiments, vehicle groups 132 may be retrieved from vehicle database 116.

With continued reference to FIG. 1, in an embodiment, vehicle group 132 may include a location group 152. For the purposes of this disclosure, a "location group" is a set of associative location information of vehicle data. In some embodiments, location information 124 of vehicle data 112 may include a plurality of same address of vehicle 120's destination. Each location group 152, in a non-limiting example, may include one address of destination of vehicle 120 and every location information 124 that matches with the address. For example, and without limitation, when vehicle 120 made trips to destinations for ten times and five of the trips were to 20 W 30$^{th}$ St., New York, NY 10001, then vehicle data 112 may include location information 124 of the five (20 W 30$^{th}$ St., New York, NY 10001) and processor 104 may classify the five location information 124 to a first location group 152, where the first location group 152 only includes location information 124 of 20 W 30$^{th}$ St., New York, NY 10001. As a non-limiting example, location group 152 may include a first location group, second location group, third location group, and the like, where each group includes different location. As another non-limiting example, location group 152 may be named with location information that the location group 152 contains. For example, and without limitation, location group 152 may include a 20 W 30$^{th}$ St., New York, NY 10001 group, 20 W 34$^{th}$ St., New York, NY 10001 group, 20 W 28$^{th}$ St., New York, NY 10001 group, 120 Brookline Ave, Boston MA, 02215 group, or the like, where each location group 152 includes location information 124 that matches with the name of the location group 152.

With continued reference to FIG. 1, in some embodiments, each location group 152 may include an accident group. For the purposes of this disclosure, an "accident group" is a set of associative accidents in a specific location. As a non-limiting example, accident group may include a traffic accident, occupational accident, home accident, sports accident, recreational accident, public space accident, natural disaster, traffic offenses, homicide, assault, robbery, domestic violence, burglary, theft group, or the like. In a non-limiting example, every vehicle's destination may include accident or accident information. Therefore, as a non-limiting example, each location group 152 may include at least an accident group. For example, and without limitation, when a 20 W 34$^{th}$ St., New York, NY 10001 group of location group 152 includes robbery, traffic accident and occupational accident, the 20 W 34$^{th}$ St., New York, NY 10001 group may include a robbery, traffic accident and occupational accident group, where each accident group includes accidents occurred at 20 W 34$^{th}$ St., New York, NY 10001. For example, and without limitation, when a 10001 group of location group 152 includes robbery, traffic accident and occupational accident, the 10001 group may include a robbery, traffic accident and occupational accident group, where each accident group includes accidents occurred in area of 10001 zip code. In some embodiments, accident group may include accidents within a set of adjacent locations. As a non-limiting example, one accident group may include accidents occurred at one specific location and 5 miles adjacent to the specific location, where the range can vary.

With continued reference to FIG. 1, in some embodiments, location group 152 may include a zip group. For the purposes of this disclosure, a "zip group" is a set of associative vehicle data related to a specific zip code. In a non-limiting example, zip group may include a 10001, 10002, 02215, 02108, 06010, 86556 group, or the like. As a non-limiting example, location information 124 of 20 W 34$^{th}$ St., New York, NY 10001, 20 W 30$^{th}$ St., New York, NY 10001, 20 W 28$^{th}$ St., New York, NY 10001 may be classified to a 10001 group of location group. As another non-limiting example, location information 124 of 120 Brookline Ave, Boston MA, 02215 may be classified to a 02215 group. In some embodiments, location group 152 may include a street group. For the purposes of this disclosure, a "street group" is a set of associative vehicle data related to a specific street name. In a non-limiting example, street group may include avenue group, or any other road name groups thereof. As a non-limiting example, street group may include 200 Brookline avenue group, 30$^{th}$ street group, 100 Clarendon street group, or the like.

With continued reference to FIG. 1, in some embodiments, location group 152 may include a city group. For the purposes of this disclosure, a "city group" is a set of associative vehicle data related to a specific city. In a non-limiting example, city group may include a Boston, New York, Connecticut, Arizona, New Jersey, North Carolina group, or the like. As a non-limiting example, location information 124 of 20 W 34$^{th}$ St., New York, NY 10001, 20 W 30$^{th}$ St., New York, NY 10001, 20 W 28$^{th}$ St., New York, NY 10001 may be classified to a New York group of location group. As another non-limiting example, location information 124 of 120 Brookline Ave, Boston MA, 02215 may be classified to a Boston group.

With continued reference to FIG. 1, in another embodiment, vehicle group 132 may include a passenger group 156. For the purposes of this disclosure, a "passenger group" is a set of associative passenger information of vehicle data. In some embodiments, passenger group 156 may include one address of vehicle 120's destination (location information 124) and passenger information 128 related to the address. As a non-limiting example, passenger group 156 may include a first passenger group, second passenger group, third passenger group, and the like, where each group includes different location. For example, and without limitation, first passenger group may include 20 W 34th St., New York, NY 10001 and any passenger information related to the location and second passenger group may include 20 W 30$^{th}$ St., New York, NY 10001 and any passenger information 128 related to the location. As another non-limiting example, passenger group 156 may be named with location information that the passenger group 156 is related to. For example, and without limitation, passenger group 156 may include a 20 W 30$^{th}$ St., New York, NY 10001 group, 20 W 34$^{th}$ St., New York, NY 10001 group, 20 W 28$^{th}$ St., New York, NY 10001 group, 120 Brookline Ave, Boston MA, 02215 group, or the like, where each passenger group 156 includes passenger information 128 that are related to with the name (address of destination) of the passenger group 156. In some embodiments, passenger group 156 may include a zip group. As a non-limiting example, a 10001 group of passenger group 156 may include passenger information that is related to a zip code of 10001. As another non-limiting example, a 02215 group may include passenger information that is related to a zip code of 02215. In some embodiments, passenger group 156 may include a street group. In some embodiments, passenger group 156 may include a city group. As a non-limiting example, a New York group of passenger group 156 may include passenger information 128 that is related to a city of New York. As another non-limiting example, a Boston group of passenger group 156 may include passenger information 128 that is related to a city of Boston. In some embodiments, passenger group may include a paid fee group. For the purposes of this disclosure, a "paid fee group" is a set of associative fee paid by passenger for injury care. As a non-limiting example, paid fee group may include a total fee that passenger paid for each injury care after accident management covered at least a portion of charged fee. For example, and without limitation, if passenger paid $40 for an injury that was occurred at 20 W 30$^{th}$ St., New York, NY 10001, then a 20 W 30$^{th}$ St., New York, NY 10001 group may include a paid fee group that includes $40.

With continued reference to FIG. 1, in some embodiments, passenger group 156 may include age, gender, date of birth, residency, religion, organ donation status, education, occupation group, or the like. As a non-limiting example, passenger information 128 of age, gender, date of birth, residency, religion, organ donation status, education level, and occupation may be classified into age, gender, date of birth, residency, religion, organ donation status, education and occupation group respectively. As another non-limiting example, passenger group may include a subgroup such as but not limited example, female group or male group in gender group, high school, bachelor, master, PhD, MD group, or the like in education group, Christian, Buddhism, Hindu group, or the like in religion group, 1-year-old, 12-year-old, 29-year-old, 102-year-old group, or the like in age group, or the like. For example, and without limitation, when subject is 20-year-old female, processor 104 may classify passenger information 128 of 20-year-old to 20-year-old group of age group and female to female group of gender group.

With continued reference to FIG. 1, in some embodiments, passenger group 156 may include an injury group. For the purpose of this disclosure, an "injury group" is a set of associative injury information. As a non-limiting example, injury group may include a cardiovascular injury, neurological injury, respiratory injury, orthopedic injury, dermal injury, eye injury, ear injury, gastrointestinal injury, renal injury urinary injury, reproductive system injury, psychological injury group, or the like. As another non-limiting example, injury group may include a subgroup. For example, and without limitation, subgroup may include a heart attack, cardiac arrhythmias, stroke, spinal cord injury, pneumothorax, fracture, dislocation, sprain, burn, skin injection, allergic reaction group, or the like. In some embodiments, each passenger group 156 may include at least an injury group. As a non-limiting example, when passenger group 156 includes a 10001 group that includes dermal injury, heart attack of cardiovascular injury, cardiac arrhythmias of cardiovascular injury and eye injury, the 10001 group may include a dermal injury group, heart attack group of cardiovascular injury group, cardiac arrhythmias group of cardiovascular injury group and eye injury group.

With continued reference to FIG. 1, in some embodiments, each injury group of passenger group 156 may include an injury care group. For the purposes of this disclosure, an "injury care group" is a set of associative injury care information related to injury information. As a non-limiting example, injury care group may include a medical treatment, rehabilitation, pain management group, or the like. In some embodiments, injury care group may include a subgroup. For example, and without limitation, subgroup of injury care group may include a dressing wounds, medication prescription, cardiac surgery, fracture fixation, joint replacement, physical therapy, intubation group, or the like. In a non-limiting example, when injury group includes heart attack group of cardiovascular injury group and related injury care information includes cardiac surgery, then injury group may include cardiac surgery group. In some embodiments, injury care group may include a charged fee group. For the purposes of this disclosure, a "charged fee group" is a set of associative fee charged to passenger for injury care. As a non-limiting example, charged fee group may include a total fee that passenger was charged for each injury care. For example, and without limitation, if passenger was charged $40000 for cardiac surgery operated for cardiovascular injury that was occurred at 20 W 30$^{th}$ St., New York, NY 10001, then a 20 W 30$^{th}$ St., New York, NY 10001 group may include a cardiovascular injury group that includes cardiac surgery group that includes a charged fee group that includes $40000.

With continued reference to FIG. 1, in some embodiments, each injury group of passenger group 156 may include an accident management group. For the purposes of this disclosure, an "accident management group" is a set of associative accident management information. As a non-limiting example, accident management group may include a health insurance, life insurance, auto insurance, homeowners insurance, renters insurance, property insurance group, or the like. As another non-limiting example, each accident management group may include related accident management information. For example, and without limitation, accident management group may include accident management name (a name of subject's insurance company), policy number, effective dates, coverage limits, deductibles, coverage types, frequency of payment, payment method, claims process, policy limitation, policy exclusion, insurance provider contact information group, or the like. In a non-limiting example, when injury group includes heart attack group of cardiovascular injury group and related accident management information includes health insurance and related accident management information, then accident management group of the injury group may include health insurance group that includes related accident management information. In some embodiments, accident management group may include a covered fee group. For the purposes of this disclosure, a "covered fee group" is a set of associative fee covered by accident management for passenger's injury care. As a non-limiting example, covered fee group may include a total fee that was charged covered by accident management for each injury care. For example, and without limitation, if passenger was charged $40000 for cardiac surgery operated for cardiovascular injury that was occurred at 20 W 30$^{th}$ St., New York, NY 10001 and health insurance covered $36000, then a 20 W 30$^{th}$ St., New York, NY 10001 group may include a cardiovascular injury group that includes health insurance group that includes a covered fee group that includes $36000. The example above is merely an example, and person skilled in the art, upon reviewing the entirety of this disclosure, may appreciate various vehicle groups 132 that can be used in apparatus 100.

With continued reference to FIG. 1, in some embodiments, processor 104 may classify vehicle data 112 into vehicle group 132 using a group classifier 160. As used in this disclosure, a "group classifier" is a machine-learning model, such as a mathematical model, neural net, or program generated by a machine learning algorithm known as a "classification algorithm," that sorts vehicle data related inputs into categories or bins of data, outputting a plurality of vehicle groups associated therewith. The group classifier 160 disclosed herein may be consistent with a classifier disclosed with respect to FIG. 2. In some embodiments, a group classifier 160 may be trained with group training data correlating vehicle data 112 to one or more vehicle group 132. For the purposes of this disclosure, "training data" is data containing correlations that a machine-learning process may use to model relationships between two or more categories of data elements. The training data disclosed herein is further disclosed with respect to FIG. 2. In some embodiments, group training data may be received from one or more users, vehicle database 116, external computing devices, and/or previous iterations of processing. As a non-limiting example, group training data may include instructions from a user, who may be an expert user, a past user in embodiments disclosed herein, or the like, which may be stored in memory and/or stored in the vehicle database 116, where the instructions may include labeling of training examples. In some embodiments, group classifier 160 may be trained to learn from past examples, and may adjust its predictions over time as new data becomes available.

With continued reference to FIG. 1, in some embodiments, group classifier 160 may be trained with group training data that correlates vehicle data 112 to location group 152 of vehicle group 132. As a non-limiting example, group training data may correlate location information 124 of vehicle data 112 to location group 152. For example, and without limitation, group training data may correlate location information 124, 20 W 34$^{th}$ St., New York, NY 10001, to 20 W 34$^{th}$ St., New York, NY 10001 group of location group 152. For example, and without limitation, group training data may correlate location information 124, 20 W 34$^{th}$ St., New York, NY 10001, to 10001 group (zip group) of location group 152. For example, and without limitation, group training data may correlate location information 124, 20 W 34$^{th}$ St., New York, NY 10001, to New York group (city group) of location group 152. As another non-limiting example, group training data may correlate accident information to accident group of location group 152.

With continued reference to FIG. 1, in some embodiments, group classifier 160 may be trained with group training data that correlates vehicle data 112 to passenger group 156 of vehicle group 132. As a non-limiting example, group training data may correlate passenger information 128 of vehicle data 112 to passenger group 156. For example, and without limitation, group training data may correlate passenger information 128 that is related to destination of 20 W 34$^{th}$ St., New York, NY 10001 to 20 W 34$^{th}$ St., New York, NY 10001 group of passenger group 156. For example, and without limitation, group training data may correlate passenger information 128 that is related to destination of 20 W 34$^{th}$ St., New York, NY 10001, to 10001 group (zip group) of passenger group 156. For example, and without limitation, group training data may correlate passenger information 128 that is related to destination of 20 W 34$^{th}$ St., New York, NY 10001, to New York group (city group) of passenger group 156. As another non-limiting example, group training data may correlate paid fee of passenger information to paid fee group of passenger group 156. As another non-limiting example, group training data may correlate injury information to injury group. As another non-limiting example, group training data may correlate injury care information to injury care group of injury group. As another non-limiting example, group training data may correlate charged fee of injury care information to charged fee group of injury care group of injury group. As another non-limiting example, group training data may correlate accident management information to accident management group of injury group. As another non-limiting example, group training data may correlate covered fee of accident management information to covered fee group of accident management group of injury group.

With continued reference to FIG. 1, in some embodiments, processor 104 may classify vehicle data 112 into vehicle group 132 using a group lookup table. For the purposes of this disclosure, a "group lookup table" is a lookup table that may classify vehicle data into one or more vehicle groups. A "lookup table," for the purposes of this disclosure, is an array of data that maps input values to output values. The lookup table may be used to replace a runtime computation with an array indexing operation. In an embodiment, the lookup table may include interpolation. For the purposes of this disclosure, an "interpolation" refers to a process for estimating values that lie between known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, as a non-limiting example, processor 104 may be configured to "lookup" a given location information 124 to find a corresponding location group 152 of vehicle group 132 using group lookup table. For example, and without limitation, group lookup table may correlate location information 124, 20 W 34$^{th}$ St., New York, NY 10001, to 20 W 34$^{th}$ St., New York, NY 10001 group of location group 152. For example, and without limitation, group lookup table may correlate location information 124, 20 W 34$^{th}$ St., New York, NY 10001, to 10001 group (zip group) of location group 152. For example, and without limitation, group lookup table may correlate location information 124, 20 W 34$^{th}$ St., New York, NY 10001, to New York group (city group) of location group 152. As another non-limiting example, group lookup table may correlate accident information to accident group of location group 152.

With continued reference to FIG. 1, as another non-limiting example, processor 104 may be configured to "lookup" given passenger information 128 of vehicle data 112 to find a corresponding passenger group 156 of vehicle group 132 using group lookup table. For example, and without limitation, group lookup table may correlate passenger information 128 that is related to destination of 20 W 34$^{th}$ St., New York, NY 10001 to 20 W 34$^{th}$ St., New York, NY 10001 group of passenger group 156. For example, and without limitation, group lookup table may correlate passenger information 128 that is related to destination of 20 W 34$^{th}$ St., New York, NY 10001, to 10001 group (zip group) of passenger group 156. For example, and without limitation, group lookup table may correlate passenger information 128 that is related to destination of 20 W 34$^{th}$ St., New York, NY 10001, to New York group (city group) of passenger group 156. As another non-limiting example, group training data may correlate paid fee of passenger information to paid fee group of passenger group 156. As another non-limiting example, group lookup table may correlate injury information to injury group. As another non-limiting example, group lookup table may correlate injury care information to injury care group of injury group. As another non-limiting example, group lookup table may correlate charged fee of injury care information to charged fee group of injury care group of injury group. As another non-limiting example, group lookup table may correlate accident management information to accident management group of injury group. As another non-limiting example, group lookup table may correlate covered fee of accident management information to covered fee group of accident management group of injury group.

With continued reference to FIG. 1, memory 108 contains instructions configuring processor 104 to analyze location group 152 of vehicle group 132 to generate a location list 136. For the purposes of this disclosure, a "location list" is a collection of location groups arranged in a specific order. In some embodiments, location list 136 may be stored in vehicle database 116. In some embodiments, location list 136 may be retrieved from vehicle database 116. In some embodiments, processor 104 may analyze location group weight of location group 152 to generate location list 136. For the purposes of this disclosure, a "location group weight" is a numerical value that indicates a number of group elements of a location group. As a non-limiting example, location group weight may be proportional to a number of trips made to a specific destination (address of location information 124). For example, and without limitation, when a 10001 group of location group 152 includes five addresses of location information 124, location group weight of the 10001 group may include 5. For example, and without limitation, when a 02215 group of location group 152 includes fifty address of location information 124, location group weight of the 10002 group may include 50. In some embodiments, processor 104 may generate a location list 136 by arranging multiple location groups in a prioritized order, based on their respective location group weights. As a non-limiting example, location group weights assigned to each group determine their relative importance, with higher location group weights indicating greater significance. In some embodiments, processor 104 may order location groups 152, placing those with higher location group weights at the top of location list 136 and gradually descending to those with lower location group weights. In some embodiments, processor 104 may generate location list 136 of among zip groups, city groups, location groups, or the like. For example, and without limitation, 10002 group that includes location group weight of 50 may be on a higher position in location list 136 compared to 10001 group that includes location group weight of 5. For example, and without limitation, 20 W 34$^{th}$ St., New York, NY 10001 group that includes location group weight of 25 may be on a higher position in location list 136 compared to 20 W 30$^{th}$ St., New York, NY 10001 group that includes location group weight of 20. By analyzing location groups 152, as a non-limiting example, generating location list 136 may allow to identify a specific location where an accident has occurred with the highest or higher frequency compared to other locations.

With continued reference to FIG. 1, in some embodiments, processor 104 may analyze location group 152 of vehicle group 132 to generate an accident list. For the purposes of this disclosure, an "accident list" is a collection of accident groups arranged in a specific order. In some embodiments, location list may include accident list. In some embodiments, accident list may be stored in vehicle database 116. In some embodiments, accident list may be retrieved from vehicle database 116. In some embodiments, processor 104 may analyze accident group weight of accident group to generate accident list. For the purposes of this disclosure, a "location group weight" is a numerical value that indicates a number of group elements of an accident group. As a non-limiting example, accident group weight may be proportional to a number of specific types of accidents occurred at a specific location. For example, and without limitation, when a 10001 group of location group 152 includes robbery group that includes five robberies, natural disaster group that includes two natural disasters, traffic offenses group that includes 20 traffic offenses and burglary group that includes 11 burglaries, the robbery group may include 5 accident group weight, natural disaster group may include 2 accident group weight, traffic offenses group may include 20 and burglary group may include 11 accident group weight. In some embodiments, processor 104 may generate accident list by arranging multiple accident groups of location group 152 in a prioritized order, based on their respective accident group weights. As a non-limiting example, accident group weights assigned to each group may determine their relative importance, with higher accident group weights indicating greater significance. In some embodiments, processor 104 may order accident groups, placing those with higher accident group weights at the top of accident list and gradually descending to those with lower accident group weights. For example, and without limitation, when a 20 W 34$^{th}$ St., New York, NY 10001 group includes a robbery, traffic accident and occupational accident group, where each accident groups includes accident group weight of 3, 10 and 7 respectively, processor 104 may generate accident list that orders the accident groups in descending order as traffic accident (10 accident group weight), occupational accident (7 accident group weight) and robbery (3 accident group weight).

With continued reference to FIG. 1, memory 108 contains instructions configuring processor 104 to analyze passenger group 156 of vehicle group 132 to generate a passenger list 140. For the purposes of this disclosure, a "passenger list" is a collection of passenger information arranged in a specific order based on their relative position within a passenger group. In some embodiments, passenger list 140 may be stored in vehicle database 116. In some embodiments, passenger list 140 may be retrieved from vehicle database 116. In some embodiments, each passenger group 156 may include passenger list 140. As a non-limiting example, passenger list 140 may include passenger list of age, gender, date of birth, residency, religion, organ donation status, education level, occupation group, or the like. In some embodiments, processor 104 may analyze passenger group weight of passenger group 156 to generate passenger list 140. For the purposes of this disclosure, a "passenger group weight" is a numerical value that indicates a number of group elements of a passenger group. As a non-limiting example, passenger group weight may be proportional to a number of passenger information 128 in passenger group 156. For example, and without limitation, when a 10001 group of passenger group 156 includes five female subjects and eleven male subjects, then female group of the passenger group 156 may include 5 passenger group weight and male group of passenger group 156 may include 11 passenger group weight. For example, and without limitation, when a 10001 group of passenger group 156 includes zero 1-year-old, two 12-year-old, eighteen 29-year-old and one 102-year-old, then 1-year-old group includes passenger group weight of 0, 12-year-old group includes passenger group weight of 2, 29-year-old group includes passenger group weight of 18 and 102-year-old group includes passenger group weight of 1. In some embodiments, processor 104 may generate passenger list 140 by arranging multiple passenger groups 156 in a prioritized order, based on their respective passenger group weights. As a non-limiting example, passenger group weights assigned to each group determine their relative importance, with higher passenger group weights indicating greater significance. In some embodiments, processor 104 may order passenger groups 156, placing those with higher passenger group weights at the top of passenger list 140 and gradually descending to those with lower passenger group weights. For example, and without limitation, 12-year-old group of age group of passenger group 156 that includes passenger group weight of 2 on a higher position in passenger list 140 compared to 102-year-old group of age group of passenger group 156 includes passenger group weight of 1. By analyzing passenger groups 156, as a non-limiting example, generating passenger list 140 may allow to identify specific types of passengers (subjects) are significantly associated with an accident compared to other passengers.

With continued reference to FIG. 1, in some embodiments, processor 104 may analyze passenger group 156 of vehicle group 132 to generate an injury list. For the purposes of this disclosure, an "injury list" is a collection of injury groups arranged in a specific order. In some embodiments, passenger list 140 may include injury list. In some embodiments, injury list may be stored in vehicle database 116. In some embodiments, injury list may be retrieved from vehicle database 116. In some embodiments, processor 104 may analyze injury group weight of injury group to generate injury list. For the purposes of this disclosure, an "injury group weight" is a numerical value that indicates a number of group elements of an injury group. As a non-limiting example, injury group weight may be proportional to a number of specific types of injuries occurred at a specific location. For example, and without limitation, when a 10001 group of passenger group 156 includes dermal injury group that includes eleven dermal injuries, heart attack group of cardiovascular injury group that includes two heart attacks, cardiac arrhythmias group of cardiovascular injury group that includes one cardiac arrhythmias and eye injury group that includes five eye injuries, then dermal injury group may include 11 injury group weight, heart attack group of cardiovascular injury group may include 2 injury group weight, cardiac arrhythmias group of cardiovascular injury group may include 1 injury group weight and eye injury group may include 5 injury group weight. In some embodiments, processor 104 may generate injury list by arranging multiple injury groups of passenger group 156 in a prioritized order, based on their respective injury group weights. As a non-limiting example, injury group weights assigned to each group may determine their relative importance, with higher injury group weights indicating greater significance. In some embodiments, processor 104 may order injury groups, placing those with higher injury group weights at the top of injury list and gradually descending to those with lower injury group weights. For example, and without limitation, when a 20 W 34$^{th}$ St., New York, NY 10001 group includes dermal injury group that includes 11 injury group weight, heart attack group of cardiovascular injury group that includes 2 injury group weight, cardiac arrhythmias group of cardiovascular injury group that includes 1 injury group weight and eye injury group that includes 5 injury group weight, processor 104 may generate injury list that orders the injury groups in descending order as dermal injury group (11 injury group weight), eye injury group (5 injury group weight), heart attack group (2 injury group weight) and cardiac arrhythmias group (1 injury group weight).

With continued reference to FIG. 1, in some embodiments, processor 104 may analyze injury group of passenger group 156 to generate an accident management list. As a non-limiting example, processor 104 may analyze accident management list group of injury group to generate accident management list. For the purposes of this disclosure, an "accident management list" is a collection of accident management groups arranged in a specific order. In some embodiments, injury list may include accident management list. In some embodiments, accident management list may be stored in vehicle database 116. In some embodiments, accident management list may be retrieved from vehicle database 116. In some embodiments, processor 104 may analyze accident management group weight of accident management group to generate accident management list. For the purposes of this disclosure, an "accident management group weight" is a numerical value that indicates a number of group elements of an accident management group. As a non-limiting example, accident management group weight may be proportional to a number of group elements in accident management group. For example, and without limitation, when a 10001 group of injury group includes accident management group that includes accident management name group, where the accident management name group includes 'company A' group that includes five 'company A's, 'company B' group that includes ten 'company B's and 'company C' group that includes seven 'company C's, then 'company A' group may include 5 accident management group weight, 'company B' group may include 10 accident management group weight and 'company C' group may include 7 accident management group weight. In some embodiments, processor 104 may generate accident management list by arranging multiple accident management groups of injury group in a prioritized order, based on their respective accident management group weights. As a non-limiting example, accident management group weights assigned to each group may determine their relative importance, with higher accident management group weights indicating greater significance. In some embodiments, processor 104 may order accident management groups, placing those with higher accident management group weights at the top of accident management list and gradually descending to those with lower accident management group weights. For example, and without limitation, when an injury group of a 20 W 34$^{th}$ St., New York, NY 10001 group includes accident management name group of accident management group that includes 'company A' group with 5 accident management group weight, 'company B' group with 10 accident management group weight and 'company C' group with 7 accident management group weight, then processor 104 may generate accident management list that orders the accident management groups in descending order as 'company B' group (10 accident management group weight), 'company C' group (7 accident management group weight) and 'company A' group (5 accident management group weight).

With continued reference to FIG. 1, in some embodiments, processor 104 may generate passenger list 140 as a function of an accident management score. In some embodiments, processor 104 may be configured to determine an accident management score as a function of passenger group 156. For the purposes of this disclosure, an "accident management score" is a value representing an evaluation of accident management. In an embodiment, accident management score may be a quantitative characteristic, such as a numerical value within a set range. As a non-limiting example, accident management score may be 0, 3, 5, 10, 20, 88, 100, and the like. As another non-limiting example, accident management score may be a '20' for a score range of 0-100, where '0' may represent accident management having low coverage for accident or injury and '100' represents accident management having high coverage for accident or injury. In some embodiments, processor 104 may determine accident management score as a function of charged fee group and covered fee group or paid fee group of passenger group 156. In some embodiments, accident management score may include a percentage of covered fee over charged fee. As a non-limiting example, when covered fee is $70 and charged fee is $100, then the percentage may include 70. In some embodiments, accident management score may include a percentage of paid fee over charged fee. As a non-limiting example, when paid fee is $30 and charged fee is $100, then the percentage may include 30. In some embodiments, processor 104 may generate accident management list of passenger list 140 by arranging accident managements or programs of accident managements that includes accident management score in descending order if the accident management score includes a percentage of covered fee over charged fee. In some embodiments, processor 104 may generate accident management list of passenger list 140 by arranging accident managements or programs of accident managements that includes accident management score in ascending order if the accident management score includes a percentage of paid fee over charged fee.

With continued reference to FIG. 1, in other non-limiting embodiments, accident management score may be a quality characteristic, such as a color coding, where each color is associated with coverage rate of accident management. As a non-limiting example, accident management score may be red, where red may represent a minimum and/or no coverage rate for accident or injury. As another non-limiting example, accident management score may be green, where green may represent high coverage rate for accident or injury. As another non-limiting example, accident management score may be light grey when there is low coverage rate for accident or injury and the color may get darker as coverage rate for accident or injury increases. In some embodiments, accident management score may include low to high scoring. As a non-limiting example, accident management score may be 'low' when there is low coverage rate for accident or injury and accident management score may be 'high' when there is high coverage rate for accident or injury. In some embodiments, accident management score may be updated in real-time as processor 104 receives new passenger information 128.

With continued reference to FIG. 1, processor 104 may determine accident management score using a score machine learning model. For the purposes of this disclosure, a "score machine learning model" is a machine learning model that determines an accident management score. The score machine learning model disclosed herein may be consistent with a machine learning model disclosed with respect to FIG. 2. In some embodiments, score machine learning model may be trained with score training data. For the purposes of this disclosure, "user score training data" is training data that is used to train a score machine learning model. The training data disclosed herein is further disclosed with respect to FIG. 2. In some embodiments, score machine learning model may be used by processor 104 to generate accident management score by analyzing large amounts of data from score training data, and using that data to identify patterns and make decisions about accident management score. As a non-limiting example, score machine learning model may use algorithms and statistical techniques as described in the entirety of this disclosure. In an embodiment, score training data may correlate covered fee or paid fee with charged fee and output accident management score. As a non-limiting example, score training data may correlate injury information group, injury care information group and accident management information group and output accident management score. For example and without limitation, score training data may correlate covered fee group, paid fee group and charged fee group to the accident management score, 80. In some embodiments, score training data may be received from one or more users, vehicle database 116, external computing devices, and/or previous iterations of processing. As a non-limiting example, score training data may include instructions from a user, who may be an expert user, a past user in embodiments disclosed herein, or the like, which may be stored in memory and/or stored in vehicle database 116, where the instructions may include labeling of training examples. In some embodiments, score machine learning model may be trained to learn from past examples, and may adjust its predictions over time as new data becomes available.

With continued reference to FIG. 1, in some embodiments, at least a processor 104 may determine accident management score using a score lookup table. For the purposes of this disclosure, a "score lookup table" is a lookup table that determines an accident management score. The score lookup table disclosed herein may be consistent with a lookup table disclosed above. In some embodiments, processor 104 may 'lookup' given injury information group, injury care information group and accident management information group to find corresponding accident management score using score lookup table. For example, and without limitation, score lookup table may correlate covered fee group, paid fee group and charged fee group to corresponding accident management score.

With continued reference to FIG. 1, in some embodiments, location group weight, injury group weight, passenger group weight and/or accident management group weight may include a weight rate. For the purposes of this disclosure, "weight rate" is a proportion of group weight in relation to a specific group. As a non-limiting example, weight rate may include 1.5, 1, 2, 5, 10, 12, or the like. In some embodiments, weight rate may give greater significance to a specific injury group compared to other injury group. As a non-limiting example, if burglary group includes weight rate of 2 and traffic violation group includes weight rate of 1, then the burglary group may include twice greater significance compared to the traffic violation group. As another non-limiting example, if shooting group includes weight rate of 20 and heat attack group includes weight rate of 12, then the shooting group includes greater significance than the heat attack group. In some embodiments, weight rate may be stored in vehicle database 116. In some embodiments, weight rate may be retrieved from vehicle database 116. In some embodiments, weight rate may be manually input by data provider. In some embodiments, injury list may be determined as a function of injury group weight and weight rate. As a non-limiting example, if traffic violation group includes injury group weight of 20 and weight rate of 2 and burglary group includes injury group weight of 10 and weight rate of 8, then traffic violation group may include total injury group weight of 40 (20×2) and burglary group may include total injury group weight of 80 (10×8), therefore burglary group may be at higher position in injury list than traffic violation group. Examples above are merely examples of using weight rate to injury group, injury group weight and injury list, and persons skilled in the art, upon reviewing the entirety of this disclosure, may appreciate that weight rate can be applied to location group, accident group, passenger group, injury care group, accident management group, location list 136, accident list, passenger list 140, accident management list, or the like.

With continued reference to FIG. 1, in some embodiments, processor 104 may determine location list 136 and/or passenger list 140 using a list classifier. For the purposes of this disclosure, a "list classifier" is a machine-learning model, such as a mathematical model, neural net, or program generated by a machine learning algorithm known as a "classification algorithm," that sorts vehicle group 132 and group weight related inputs into categories or bins of data, outputting location list 136 or passenger list 140 associated therewith. The list classifier disclosed herein may be consistent with a classifier disclosed with respect to FIG. 2. In some embodiments, list classifier may be trained with list training data correlating vehicle group 132 and group weight to location list 136 or passenger list 140. The training data disclosed herein is further disclosed with respect to FIG. 2. In some embodiments, group training data may be received from one or more data providers, vehicle database 116, external computing devices, and/or previous iterations of processing. As a non-limiting example, group training data may include instructions from a data provider, who may be an expert data provider, a past data provider in embodiments disclosed herein, or the like, which may be stored in memory and/or stored in the vehicle database 116, where the instructions may include labeling of training examples. In some embodiments, list classifier may be trained to learn from past examples, and may adjust its predictions over time as new data becomes available.

With continued reference to FIG. 1, in some embodiments, list classifier may be trained with list training data that correlates accident group, accident group weight and its weight rate to accident list. In some embodiments, list classifier may be trained with list training data that correlates passenger group 156, passenger group weight and its weight rate to passenger list 140. In some embodiments, list classifier may be trained with list training data that correlates injury group, injury group weight and its weight rate to injury list. In some embodiments, list classifier may be trained with list training data that correlates location group 152, location group weight and its weight rate to location list 136. In some embodiments, list classifier may be trained with list training data that correlates accident management group, accident management group weight and its weight rate to accident management list.

With continued reference to FIG. 1, in some embodiments, processor 104 may determine location list 136 and/or passenger list 140 using a list lookup table. For the purposes of this disclosure, a "list lookup table" is a lookup table that determines a location list and/or a passenger list using a vehicle group. The list lookup table may be consistent with lookup table described above. In some embodiments, processor 104 may 'lookup' given accident group, accident group weight and its weight rate to find corresponding accident list. In some embodiments, processor 104 may 'lookup' given passenger group 156, passenger group weight and its weight rate to find corresponding passenger list 140. In some embodiments, processor 104 may 'lookup' given injury group, injury group weight and its weight rate to find corresponding injury list. In some embodiments, processor 104 may 'lookup' given location group 152, location group weight and its weight rate to find corresponding location list 136. In some embodiments, processor 104 may 'lookup' given accident management group, accident management group weight and its weight rate to find corresponding accident management list.

With continued reference to FIG. 1, memory 108 contains instructions configuring processor 104 to generate a location report 144. For the purposes of this disclosure, a "location report" is a suggestion for an improvement related to location information for a data requester of a user. As a non-limiting example, location report 144 may be used for traffic engineering, city planning, landscape architecture, or the like. For example, and without limitation, location report 144 may be used for optimizing traffic flow, enhancing safety of area, minimize transportation congestion, improve transportation efficiency, or the like. As another non-limiting example, location report 144 may be used as a reference for any research. In some embodiments, location report 144 may be identified by one or more organizations that relate to, represent, and/or study traffic engineering, city planning, landscape architecture, or the like, such as but not limited to American Planning Association (APA), Urban Land Institute (ULI), National Association of City Transportation Officials (NACTO), Institute of Transportation Engineers (ITE), Federal Highway Administration (FHWA), Transportation Research Board (TRB), Insurance Information Institute (III), National Association of Insurance Commissioners (NAIC), American Association of Insurance Services (AAIS), Insurance Institute for Highway Safety (IIHS), National Insurance Crime Bureau (NICB), or the like. In some embodiments, location report 144 may be stored in vehicle database 116. In some embodiments, location report 144 may be retrieved from vehicle database 116. In some embodiments, data provider of user may manually input location report 144.

With continued reference to FIG. 1, in some embodiments, location report 144 may include a road list. For the purposes of this disclosure, a "road list" is a suggestion for traffic safety improvement. In a non-limiting example, road list may reduce occurrence of traffic accidents, minimize severity of accidents, create safer road environments, or the like. As a non-limiting example, road list may include improving visibility, optimizing traffic signal timings, adding or modifying signage, enhancing pedestrian and cycling infrastructure, implementing traffic calming techniques, such as but not limited to speed humps, raised crosswalks, traffic islands, chicanes, narrowing roadways, or the like, implementing or improving usage of speed camera or redlight camera, adjusting lane width, modifying curves and gradients, implementing or improving proper sight distance, implementing or improving clear signage, constructing sidewalks, crosswalks, bike lanes, shared-use paths, guardrails, crash cushions, crash barriers or rumble strips, implementing or improving tactile indicators or audible signals, implementing or improving educational campaigns or programs to raise awareness about safe driving behaviors, pedestrian and cyclist safety, and the importance of obeying traffic laws, increasing or implementing police presence, or the like.

With continued reference to FIG. 1, in some embodiments, location report 144 may include a landscape list. For the purposes of this disclosure, a "landscape list" is a suggestion for landscape or city improvement. As a non-limiting example, a landscape list may include implementing or improving surveillance system, implementing or improving access control system, implementing or improving lighting design of public spaces, implementing or improving perimeter security, implementing crime prevention through environmental design (CPTED) principles, implementing or improving emergency response systems, ensuring that buildings and infrastructure adhere to safety codes and standards, or the like.

With continued reference to FIG. 1, in some embodiments, processor 104 may derive location report 144 using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to scrape location report 144 or passenger report 148 from websites related to city planning, traffic engineering, insurance planning, or the like. For example, and without limitation, websites may include American Planning Association (APA), Urban Land Institute (ULI), National Association of City Transportation Officials (NACTO), Institute of Transportation Engineers (ITE), Federal Highway Administration (FHWA), Transportation Research Board (TRB), Insurance Information Institute (III), National Association of Insurance Commissioners (NAIC), American Association of Insurance Services (AAIS), Insurance Institute for Highway Safety (IIHS), National Insurance Crime Bureau (NICB), or the like. The web crawler may be seeded and/or trained with a reputable to begin the search. A web crawler may be generated by processor 104. In some embodiments, web crawler may be trained with information received from user (data provider) through a user interface. In some embodiments, web crawler may be configured to generate a web query. A web query may include search criteria received from user. For example, user may submit a plurality of websites for the web crawler to search and correlate to location report 144 and/or passenger report 148, and the like. Additionally, the web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 104, received from a machine learning model, and/or received from user. In some embodiments, a relevancy score may include a range of numerical values that may correspond to a relevancy strength of data received from a web crawler function. As a non-limiting example, a web crawler function may search the Internet for location report 144 and/or passenger report 148 related to location list 136 and/or passenger list 140.

With continued reference to FIG. 1, in some embodiments, processor 104 may generate location report 144 as a function of location list 136. As a non-limiting example, location list 136 may include a plurality of locations that includes high frequencies of accidents and each of the plurality of locations may include contributing factor of accidents. Then, processor 104, in a non-limiting example, analyze contributing factor using OCR or language processing model and obtain a keyword of contributing factor. In some embodiments, processor 104 may determine location report 144 by matching keyword of contributing factor of locations of location list 136 and location report 144. For example, and without limitation when contributing factor of location list 136 includes 'unclear,' 'signage,' or 'unclear signage' keywords, processor 104 may match the keywords with location report 144 of implementing or improving clear signage, improving visibility of road list of location list 136.

With continued reference to FIG. 1, in some embodiments, processor 104 may generate location report 144 using a location report machine learning model 164. For the purposes of this disclosure, a "location report machine learning model" is a machine learning model that generates location report 144. In some embodiments, location report machine learning model 164 may be consistent with a machine learning model described with respect to FIG. 2. In some embodiments, location report machine learning model 164 may be trained with location report training data. For the purposes of this disclosure, "location report training data" is training data that is used to train a location report machine learning model. The location report training data disclosed herein may be consistent with training data described with respect to FIG. 2. In some embodiments, location report machine learning model 164 may be used by processor 104 to generate location report 144 by analyzing large amounts of data from location report training data, and using that data to identify patterns and make decisions about location report 144. As a non-limiting example, location report machine learning model 164 may use algorithms and statistical techniques as described in the entirety of this disclosure. In some embodiments, location report training data may correlate vehicle data 112, vehicle group 132, location group weight and/or location list 136 to location report 144. Then, in a non-limiting example, processor 104 may use location report machine learning model 164 to predict location report 144, taking into account factors in location report training data. In some embodiments, location report training data may be received from one or more users, vehicle database 116, external computing devices, and/or previous iterations of processing. As a non-limiting example, location report training data may include instructions from a user, who may be an expert user, a past user in embodiments disclosed herein, or the like, which may be stored in memory and/or stored in vehicle database 116, where the instructions may include labeling of training examples. In some embodiments, location report machine learning model 164 may be trained to learn from past examples, and may adjust its predictions over time as new data becomes available.

With continued reference to FIG. 1, in some embodiments, processor 104 may generate location report 144 using a location report lookup table. In some embodiments, location report lookup table may be consistent with any lookup table disclosed in the entirety of this disclosure. In some embodiments, location report lookup table may 'lookup' given location list 136 and/or accident list to find a corresponding location report 144. As a non-limiting example, location report lookup table may correlate accident list and/or location list 136 that includes highest location group weight and/or accident group weight and keyword related to traffic to road list of location report 144. As another non-limiting example, location report lookup table may correlate accident list and/or location list 136 that includes highest location group weight and/or accident group weight and keyword related to landscape or city planning to landscape list of location report 144.

With continued reference to FIG. 1, memory 108 contains instructions configuring processor 104 to generate a passenger report 148 as a function of passenger list 140. For the purposes of this disclosure, a "passenger report" is a suggestion for an improvement related to passenger information for a data requester of a user. As a non-limiting example, passenger report 148 may be used for traffic engineering, city planning, landscape architecture, or the like. For example, and without limitation, passenger report 148 may be used for improving public safety, implementing or modifying a policy, rule, system, program or law, crime prevention, improve transportation safety, implementing or modifying insurance plan, improving or modifying health care system, developing or modifying educational program or enforcement campaigns, evidence-based decision making, ensuring financial sustainability, or the like. As another non-limiting example, passenger report 148 may be used as a reference for any research. In a non-limiting example, passenger report 148 may include implementing supporting program for elderly, implementing educational program for teenagers, implementing supporting program for homeless, implementing supporting program for low-income families and individuals, implementing supporting program for pregnant women, implementing supporting program for single parent family, implementing supporting program for immigrants, or any policies or systems that can improve public interest. In some embodiments, passenger report 148 may be stored in vehicle database 116. In some embodiments, passenger report 148 may be retrieved from vehicle database 116. In some embodiments, data provider of user may manually input passenger report 148. Persons skilled in the art, upon reviewing the entirety of this disclosure, may appreciate various passenger reports 148 that can be used in apparatus 100.

With continued reference to FIG. 1, in some embodiments, passenger report 148 may be identified by one or more organizations that relate to, represent, and/or study human, statistics related to accidents, accident management system, or the like, such as but not limited to Insurance Information Institute (III), National Association of Insurance Commissioners (NAIC), American Association of Insurance Services (AAIS), Centers for Medicare & Medicaid Services (CMS), National Association of Health Underwriters (NAHU), Agency for Healthcare Research and Quality (AHRQ), World Health Organization (WHO), Health Resources and Services Administration (HRSA), National Institute for Health and Care Excellence (NICE), Federal Election Commission (FEC), American Planning Association (APA), International City/County Management Association (ICMA), U.S. Department of Housing and Urban Development (HUD), U.S. Department of Health and Human Services (HHS), or the like.

With continued reference to FIG. 1, in some embodiments, passenger report 148 may include a passenger relation list. For the purposes of this disclosure, a "passenger relation list" is a suggestion for improvement of injury care or accident management related to a subject. In a non-limiting example, passenger relation list may improve injury care system, improve accident management system, reduce total paid fee, increase covered fee, reduce charge fee, reduce occurrence of accidents, or the like. As a non-limiting example, passenger relation list may include increasing coverage for specific accidents, injuries or injury cares, increase or modify coverage limit for accidents injuries or injury cares, increasing educational program or campaign, improving or modifying insurance sales strategy, or the like. Persons skilled in the art, upon reviewing the entirety of this disclosure, may appreciate various passenger relation lists that may be used for passenger report 148.

With continued reference to FIG. 1, in some embodiments, processor 104 may derive passenger report 148 using web crawler. The web crawler disclosed herein is further described above. In some embodiments, processor 104 may generate passenger report 148 as a function of passenger list 140. As a non-limiting example, when passenger list 140 includes a list of passenger information 128 that includes high passenger group weight, then processor 104 may analyze the list of passenger information 128 using OCR or language processing model and obtain a keyword of the passenger information 128. In some embodiments, processor 104 may determine passenger report 148 by matching keyword of passenger information 128 of passenger list 140 with passenger report 148. For example, and without limitation, when passenger information 128 of passenger list 140 includes 'male,' '18-year-old,' and/or 'college' keywords, processor 104 may match the keywords with passenger report 148 of implementing educational program for teenagers. For example, and without limitation, when passenger information 128 of passenger list 140 includes 'female,' '18-year-old,' and/or 'pregnant' keywords, processor 104 may match the keywords with passenger report 148 of implementing educational program for teenagers, implementing supporting program for pregnant woman or implementing supporting program for single parent family.

With continued reference to FIG. 1, in some embodiments, processor 104 may generate passenger relation list of passenger report 148 as a function of passenger list 140, injury list and/or accident management list. As a non-limiting example, when passenger list 140 includes a list of passenger information 128 that includes high passenger group weight, then processor 104, injury list includes a list of injuries that includes high injury group weight and accident management list includes a list of accident management that includes high accident management group weight, the processor 104 may analyze passenger list 140, injury list and accident management list using OCR or language processing model to find keywords of the lists. In some embodiments, processor 104 may determine passenger relation list of passenger report 148 by matching keywords of the list with passenger relation list. For example, and without limitation, when passenger list 140 includes 'male,' '18-year-old,' and/or 'college' keywords, injury list includes 'heart,' 'heart attack' and/or 'cardiovascular' keywords and accident management list includes 'Company A' keyword, then processor 104 may match the keywords with passenger report 148 of improving health care system related to cardiovascular disease, modifying insurance sales strategy to suggest 'Company A' health care insurance (accident management) to teenagers, modifying coverage of health care insurance (accident management) to cover cardiovascular disease or modifying coverage limits of health care insurance for cardiovascular disease to cover teenagers. For example, and without limitation, when passenger information 128 of passenger list 140 includes 'female,' '18-year-old,' and/or 'pregnant' keywords, injury list includes 'orthopedic,' 'fracture,' and/or 'dislocation' keywords and accident management list includes 'Company B' keyword, then processor 104 may match the keywords with passenger report 148 of improving health care system related to orthopedic injury, improving health care system related to pregnancy, modifying insurance sales strategy to suggest 'Company B' health care insurance (accident management) to pregnant women, modifying coverage of health care insurance (accident management) to cover orthopedic injury, modifying coverage limits of health care insurance for orthopedic injury to cover pregnant women, implementing supporting program for pregnant women or pregnant women with orthopedic injury.

With continued reference to FIG. 1, in some embodiments, processor 104 may generate passenger report 148 using a passenger report machine learning model 168. For the purposes of this disclosure, a "passenger report machine learning model" is a machine learning model that generates passenger report. In some embodiments, passenger report machine learning model 168 may be consistent with a machine learning model described with respect to FIG. 2. In some embodiments, passenger report machine learning model 168 may be trained with passenger report training data. For the purposes of this disclosure, "passenger report training data" is training data that is used to train a passenger report machine learning model. The passenger report training data disclosed herein may be consistent with training data described with respect to FIG. 2. In some embodiments, passenger report machine learning model 168 may be used by processor 104 to generate passenger report 148 by analyzing large amounts of data from passenger report training data, and using that data to identify patterns and make decisions about passenger report 148. As a non-limiting example, passenger report machine learning model 168 may use algorithms and statistical techniques as described in the entirety of this disclosure. In some embodiments, passenger report training data may correlate vehicle data 112, vehicle group 132, passenger group weight, injury group weight, accident management group weight, accident management score, injury list, accident management list, and/or passenger list 140 to passenger report 148. Then, in a non-limiting example, processor 104 may use passenger report machine learning model 168 to predict passenger report 148, taking into account factors in passenger report training data. In some embodiments, passenger report training data may be received from one or more users, vehicle database 116, external computing devices, and/or previous iterations of processing. As a non-limiting example, passenger report training data may include instructions from a user, who may be an expert user, a past user in embodiments disclosed herein, or the like, which may be stored in memory and/or stored in vehicle database 116, where the instructions may include labeling of training examples. In some embodiments, passenger report machine learning model 168 may be trained to learn from past examples, and may adjust its predictions over time as new data becomes available.

With continued reference to FIG. 1, in some embodiments, processor 104 may generate passenger report 148 using a passenger report lookup table. In some embodiments, passenger report lookup table may be consistent with any lookup table disclosed in the entirety of this disclosure. In some embodiments, passenger report lookup table may 'lookup' given passenger list 140, injury list and/or accident management list to find a corresponding passenger report 148. As a non-limiting example, passenger report lookup table may correlate injury list, accident management list and/or passenger list 140 that includes highest passenger group weight, injury group weight and/or accident management group weight and keyword related to health care to passenger relation list of passenger report 148.

Figure 2:
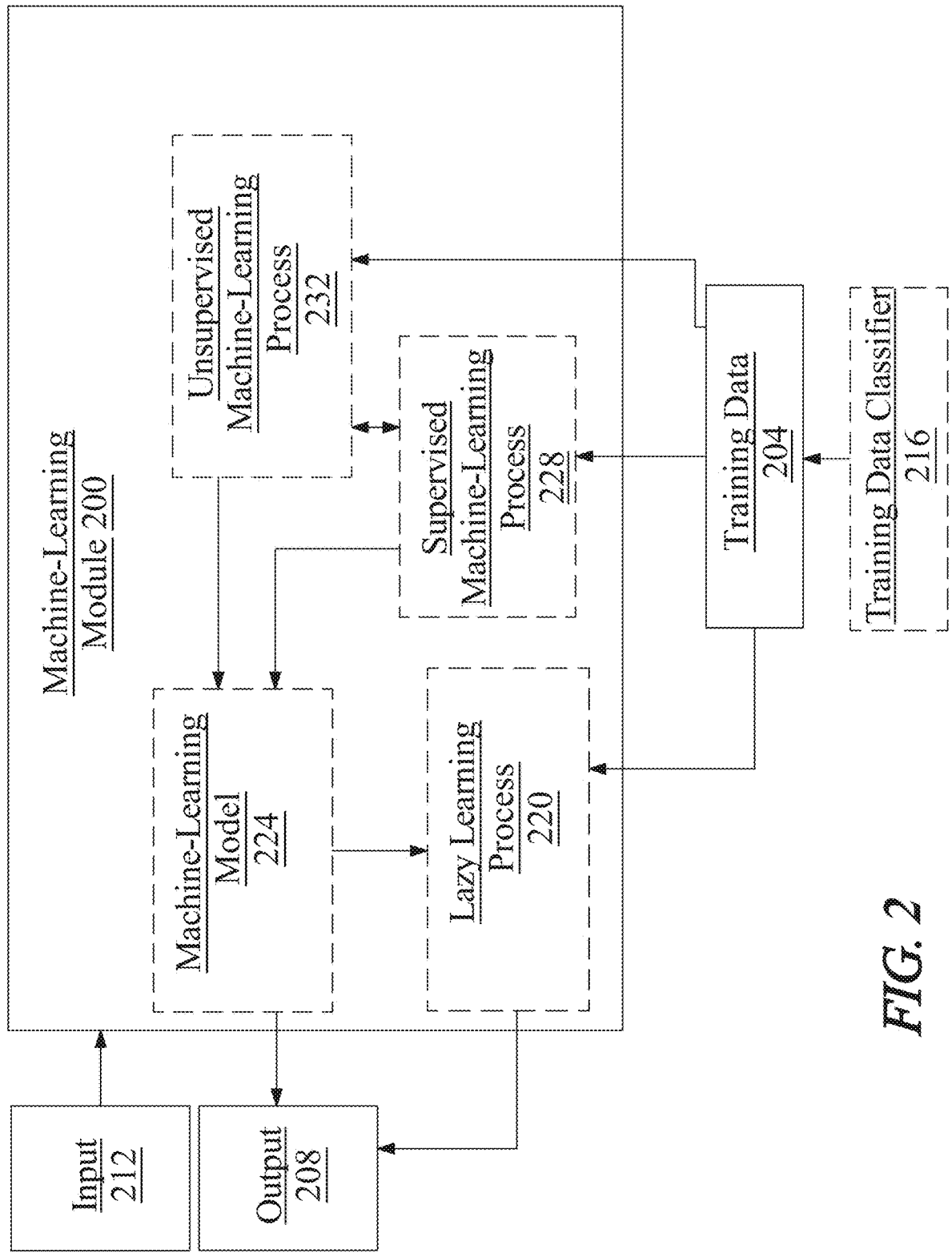
FIG. 2 illustrates a block diagram of exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

With continued reference to FIG. 2, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

With continued reference to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or Ie Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network including an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 2, machine-learning algorithms may include at least a supervised machine-learning process 228. At least a supervised machine-learning process 228, as defined herein, include algorithms that receive a training set relating several inputs to outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With continued reference to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of one divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
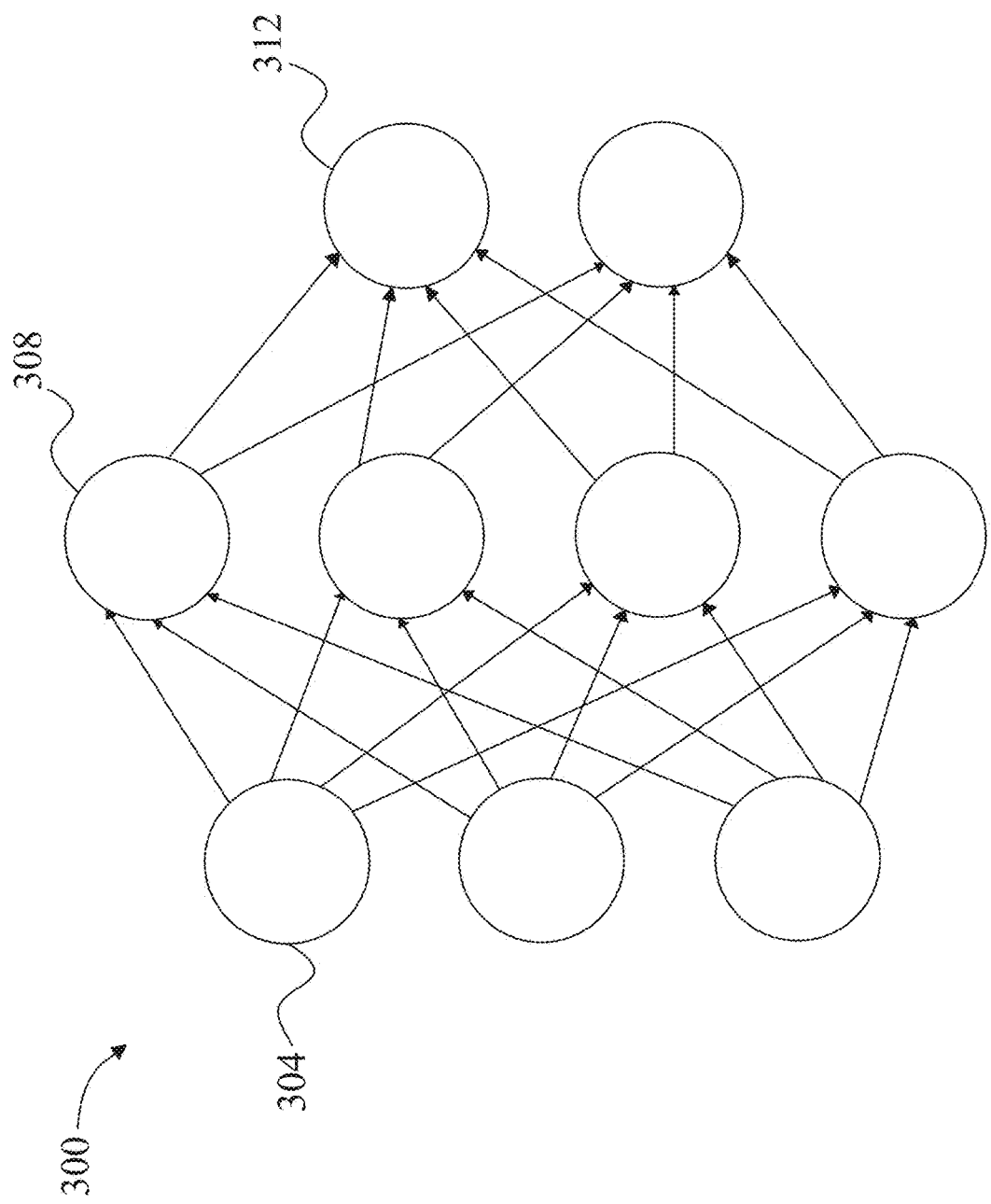
FIG. 3 illustrates a diagram of an exemplary nodal network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
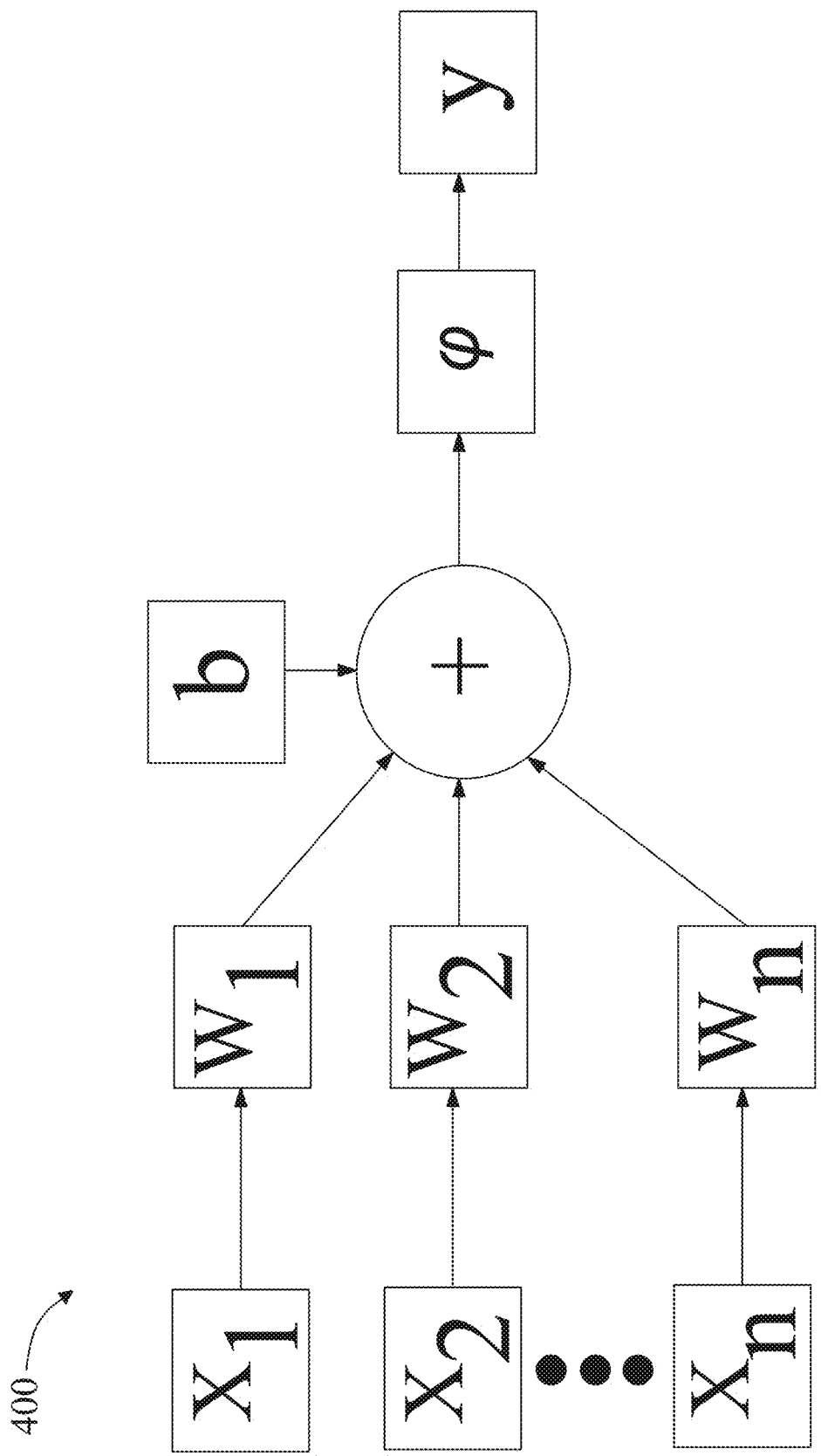
FIG. 4 illustrates a block diagram of an exemplary node.

Referring now to FIG. 4, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
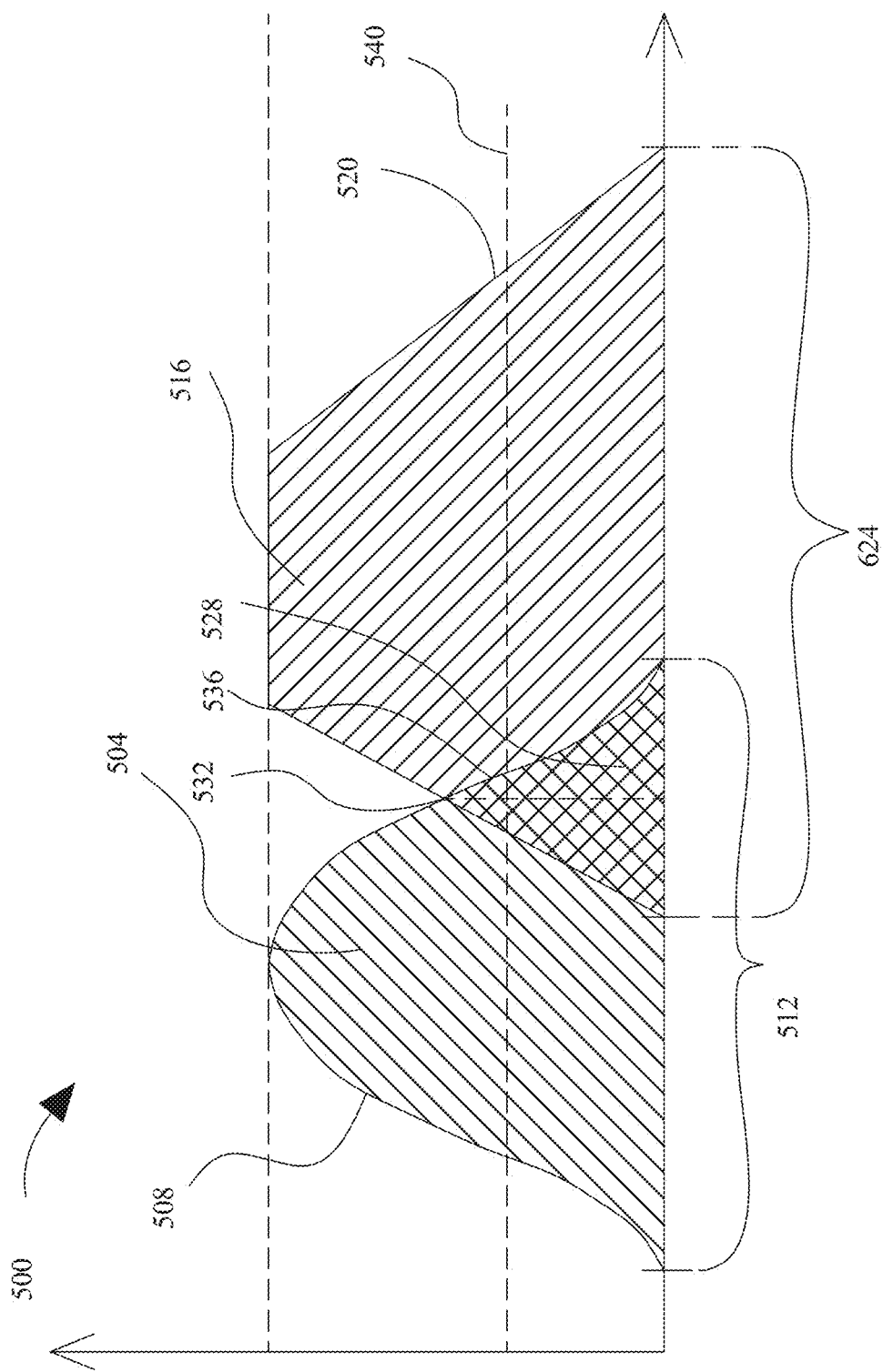
FIG. 5 illustrates a block diagram of a fuzzy set system.

Referring now to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 5, first fuzzy set 504 may represent any value or combination of values as described above, including output from one or more machine-learning models. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or an assessed groups, alone or in combination. Alternatively or additionally, each threshold may be tuned by a machine-learning and/or statistical process, for instance and without limitation as described in further detail below.

With continued reference to FIG. 5, in an embodiment, passenger list may be compared to multiple passenger reports fuzzy sets. For instance, action template data may be represented by a fuzzy set that is compared to each of the multiple passenger report fuzzy sets; and a degree of overlap exceeding a threshold between the passenger list fuzzy set and any of the multiple passenger reports fuzzy sets may cause processor to rank passenger reports as a function of the passenger list. For instance, in one embodiment there may be two passenger report fuzzy sets, representing respectively a first passenger report and a second passenger report. First passenger report may have a first fuzzy set; and second passenger report may have a second fuzzy set. Processor 104, for example, may compare a passenger list fuzzy set with each of the first and second passenger report fuzzy sets, as described above, and classify a user profile to either, both, or neither of the first and second passenger reports. Machine-learning methods as described throughout may, in a non-limiting example, generate coefficients used in fuzzy set equations as described above, such as without limitation x, c, and σ of a Gaussian set as described above, as outputs of machine-learning methods. Likewise, passenger list may be used indirectly to determine a fuzzy set, as passenger list fuzzy set may be derived from outputs of one or more machine-learning models that take the passenger list such as products and/or data directly or indirectly as inputs.

With continued reference to FIG. 5, a computing device may use a logic comparison program, such as, but not limited to, a fuzzy logic model to determine a correlation between a plurality of passenger list and a plurality of passenger reports. A correlation between passenger list and passenger reports may include, but is not limited to, irrelevant, poor, average, high, and the like; each such designation may be represented as a value for a linguistic variable representing correlation, or in other words, a fuzzy set as described above that corresponds to a degree of positive correlations as calculated using any statistical, machine-learning, or other method that may occur to a person skilled in the art upon reviewing the entirety of this disclosure. In other words, a given element of passenger list object may have a first non-zero value for membership in a first linguistic variable value such as a high correlation and a second non-zero value for membership in a second linguistic variable value such as average correlation. In some embodiments, determining a correlation may include using a linear regression model. A linear regression model may include a machine learning model. A linear regression model may be trained using a machine learning process. A linear regression model may map statistics such as, but not limited to, degree of similarity with respect to the type of passenger list and passenger reports. In some embodiments, determining a correlation between passenger list and passenger reports may include using a classification model. The classification model may be configured to input collected data and cluster data to a centroid based on, but not limited to, frequency of appearance, linguistic indicators of correlation, and the like.

Centroids may include scores assigned to them such that level of correlation of passenger list and passenger reports may each be assigned a score. In some embodiments, the classification model may include a K-means clustering model. In some embodiments, the classification model may include a particle swarm optimization model. In some embodiments, determining the classification model may include using a fuzzy inference engine. A fuzzy inference engine may be configured to map one or more elements of passenger list and passenger report data using fuzzy logic. In some embodiments, passenger list and passenger reports may be arranged by a logic comparison program into various levels of correlation arrangements. A "correlation arrangement" as used in this disclosure is any grouping of objects and/or data based on degree of match based on passenger report assessment. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure. Additionally and/or alternatively, the fuzzy set may be incorporated with passenger list.

Figure 6:
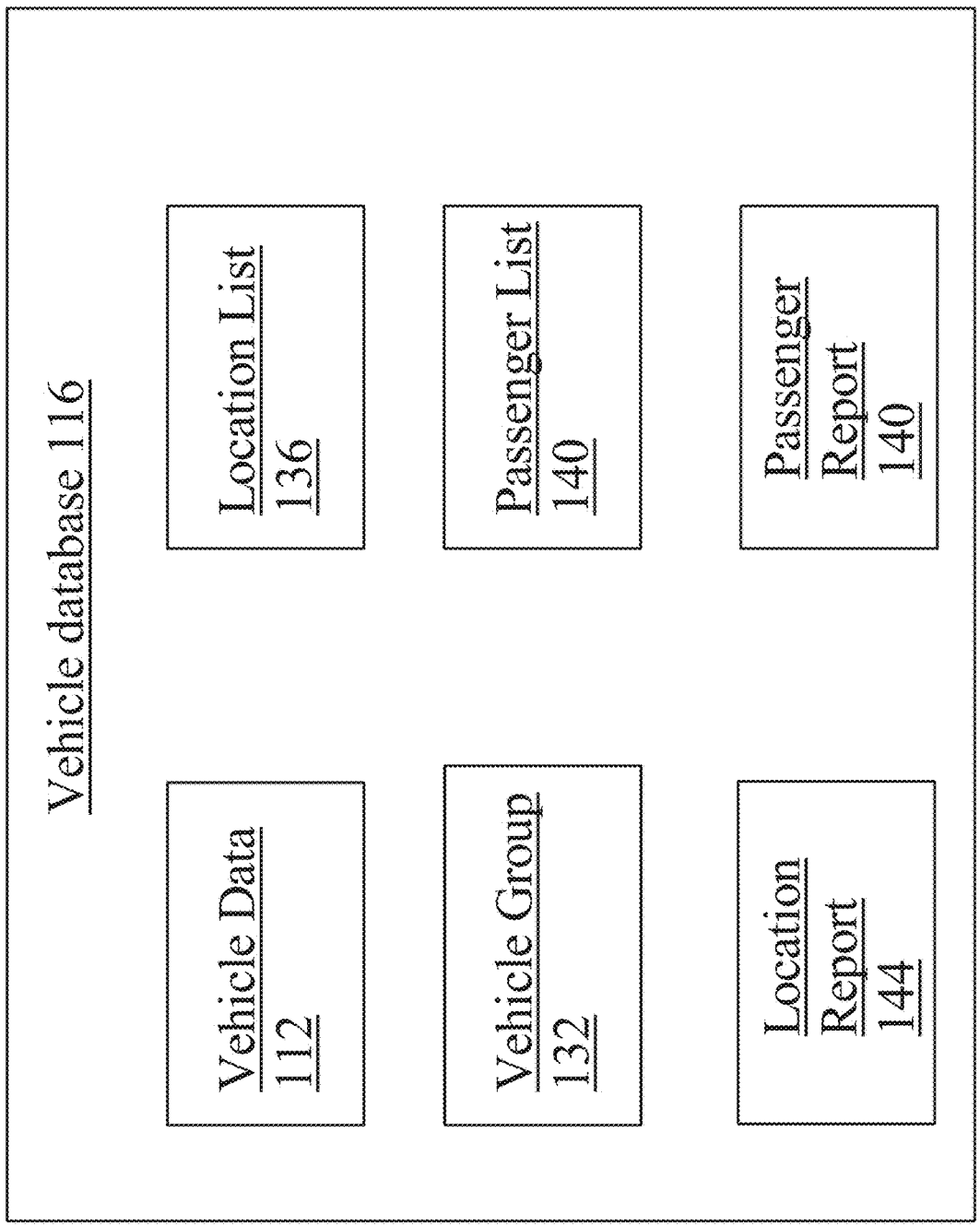
FIG. 6 illustrates a block diagram of a vehicle database.

Referring now to FIG. 6, a block diagram of an exemplary vehicle database 116 is illustrated. Vehicle database 116 is further described in detail with respect to FIG. 1. In some embodiments, vehicle database 116 may include vehicle data 112 and any data related to vehicle data 112. As a non-limiting example, vehicle database 116 may further include location information 124. For example, and without limitation, vehicle database 116 may include location address, accident information, and the like. As another non-limiting example, vehicle database 116 may further include passenger information 128. For example, and without limitation, vehicle database 116 may include billing information, injury information, injury care information, accident management information, and the like. As another non-limiting example, vehicle database 116 may further include document. For example, and without limitation, vehicle database 116 may include a police report, fire department report, EMS report, medical report, call record, radio record, or the like. As another non-limiting example, vehicle database 116 may further include any data from sensor 118, keywords derived from OCR, language processing model or ASR, any input from remote device, and the like.

With continued reference to FIG. 6, vehicle database 116 may include vehicle group 132. As a non-limiting example, vehicle database 116 may include location group. For example, and without limitation, vehicle database 116 may further include city group, zip group, address group, accident group, or the like. As another non-limiting example, vehicle database 116 may include passenger group. For example, and without limitation, vehicle database 116 may further include city group, zip group, address group, paid fee group, injury group, injury care group, charged fee group, accident management group, covered fee group, and the like.

With continued reference to FIG. 6, vehicle database 116 may include location list 136 and any data related to location list 136. As a non-limiting example, vehicle database 116 may include location group weight, accident list, and the like.

With continued reference to FIG. 6, vehicle database 116 may include passenger list 140 and any data related to passenger list 140. As a non-limiting example, vehicle database 116 may include passenger group weight, injury list, injury group weight, accident management list, accident management group weight, accident management score, score training data, and the like.

With continued reference to FIG. 6, vehicle database 116 may include location report 144 and any data related to location report 144. As a non-limiting example, vehicle database 116 may include road list, landscape list, any data derived from web crawler, keyword, location report training data, and the like.

With continued reference to FIG. 6, vehicle database 116 may include passenger report 148 and any data related to passenger report 148. As a non-limiting example, vehicle database 116 may include passenger relation list, keyword, any data derived from web crawler, passenger report training data, and the like.

Figure 7:
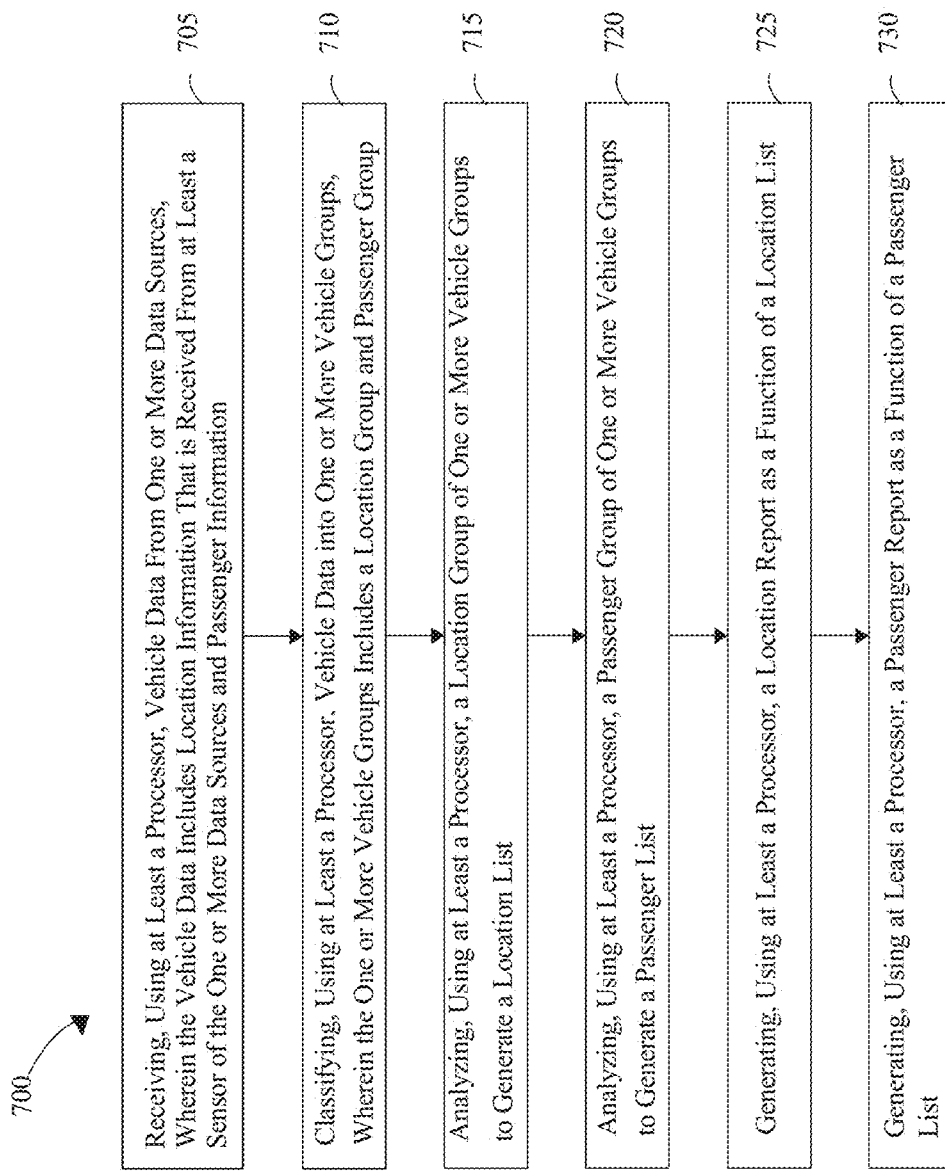
FIG. 7 illustrates a flow diagram of an exemplary method for vehicle data analysis.

Referring now to FIG. 7, a flow diagram of an exemplary method 700 for vehicle data analysis. Method 700 includes a step 705 of receiving, using at least a processor, vehicle data from one or more data sources, wherein the vehicle data includes location information, wherein the location information is received from at least a sensor of the one or more data sources and passenger information. In some embodiments, the location information may include accident information. In some embodiments, method 700 may further include receiving, using the at least a processor, the location information of the vehicle data from at least a sensor of the one or more data sources. In some embodiments, the passenger information may include injury information. These may be implemented as disclosed with respect to FIGS. 1-6.

With continued reference to FIG. 7, method 700 includes a step 710 of classifying, using at least a processor, the vehicle data into one or more vehicle groups, wherein the one or more vehicle groups includes a location group and passenger group. These may be implemented as disclosed with respect to FIGS. 1-6.

With continued reference to FIG. 7, method 700 includes a step 715 of analyzing, using at least a processor, a location group of one or more vehicle groups to generate a location list. In some embodiments, method 700 may further include generating, using the at least a processor, the location list as a function of a location group weight of the location group of the one or more vehicle groups. These may be implemented as disclosed with respect to FIGS. 1-6.

With continued reference to FIG. 7, method 700 includes a step 720 of analyzing, using at least a processor, one or more vehicle groups to generate a passenger list. In some embodiments, method 700 may further include determining, using the at least a processor, an accident management score as a function of the passenger group and generating, using the at least a processor, the passenger list as a function of the accident management score. In some embodiments, method 700 may further include determining, using the at least a processor, the accident management score using a score machine learning model, wherein the score machine learning model is trained with score training data that correlates a passenger information data set to the accident management score. These may be implemented as disclosed with respect to FIGS. 1-6.

With continued reference to FIG. 7, method 700 includes a step 725 of generating, using at least a processor, a location report as a function of a location list. In some embodiments, the location report may include a road list. In some embodiments, method 700 may further include generating, using the at least a processor, the location report using a location report machine learning model, wherein the location report machine learning model is trained with location report training data that correlates a location list data set to the location report. These may be implemented as disclosed with respect to FIGS. 1-6.

With continued reference to FIG. 7, method 700 includes a step 730 of generating, using at least a processor, a passenger report as a function of a passenger list. In some embodiments, the passenger report may include a passenger relation list. These may be implemented as disclosed with respect to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM"

device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
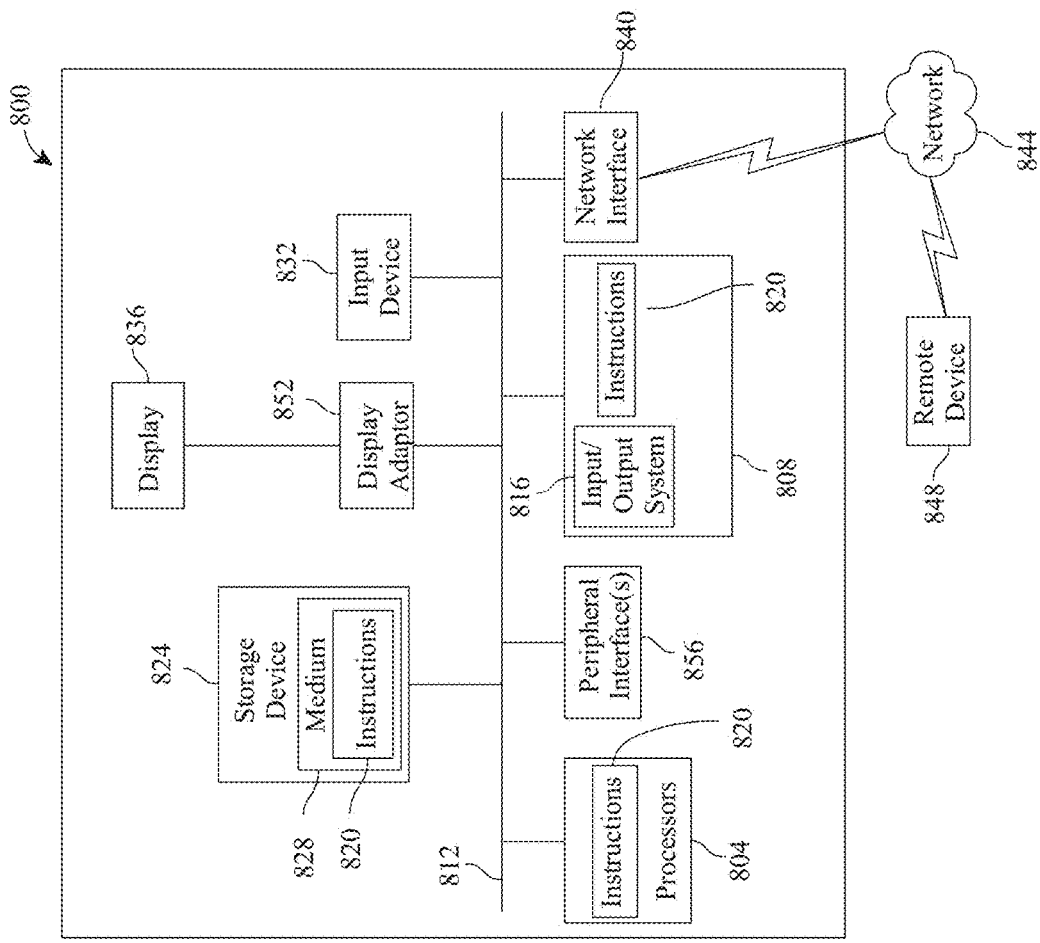
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for vehicle data analysis, the apparatus comprising:
   at least a processor; and
   a memory communicatively connected to the at least a processor, wherein the memory contains instructions configuring the at least a processor to:
   receive a plurality of instances of location information of a plurality of vehicles, wherein each instance of location information describes a destination of a vehicle involved in a traffic accident;
   categorize the plurality of instances of location information to a plurality of location groups by:
   determining group training data based on data received from a global positioning system sensor;
   training a classifier on group training data comprising example location information associated with example location groups;
   inputting into the classifier an instance of location information of the plurality of instances of location information;
   receiving as an output from the classifier a categorization of the instance of location information into a location group of the plurality of location groups;
   updating the group training data as a function of an output of a previous iteration of the classifier; and
   retraining the classifier based on updated group training data; and
   generate a location list identifying locations with high accident frequency as a function of the categorization of the plurality of instances of location information.

2. The apparatus of claim 1, wherein:
   the location group comprises a location group weight; and
   the memory contains instructions further configuring the at least a processor to generate the location list as a function of the location group weight.

3. The apparatus of claim 1, wherein the processor is further configured to receive accident information comprising contributing factor information indicating potential causes for an accident of the accident information.

4. The apparatus of claim 1, wherein each location group of the plurality of location groups comprises an accident group comprising at least one instance from the plurality of instances at one specific location and locations within a threshold distance.

5. The apparatus of claim 1, wherein the plurality of location groups comprises a plurality of zip groups, wherein each zip group is associated with a specific zip code.

6. The apparatus of claim 1, wherein generating the location list comprises determining a location group weight for each of the plurality of location groups.

7. The apparatus of claim 6, wherein generating the location list comprises arranging the plurality of location groups based on the location group weight for each location group.

8. A method for vehicle data analysis, the method comprising:
   receiving, using at least a processor,
   a plurality of instances of location information of a plurality of vehicles, wherein each instance of location information describes a destination of a vehicle involved in a traffic accident;
   categorizing, using the at least a processor, the plurality of instances of location information to a plurality of location groups by:
   determining group training data based on data received from a global positioning system sensor;
   training a classifier on group training data comprising example location information associated with example location groups;
   inputting into the classifier an instance of location information of the plurality of instances of location information;
   receiving as an output from the classifier a categorization of the instance of location information into a location group of the plurality of location groups;
   updating the group training data as a function of an output of a previous iteration of the classifier; and
   retraining the classifier based on updated group training data; and generating, using the at least a processor, a location list identifying locations with high accident frequency as a function of the categorization of the plurality of instances of location information.

9. The method of claim 8,
wherein the location list is generated as a function of a location group weight of the one or more vehicle groups.

10. The method of claim 8, further comprising receiving, using the at least a processor, accident information comprising contributing factor information indicating potential causes for an accident of the accident information.

11. The method of claim 8, wherein each location group of the plurality of location groups comprises an accident group comprising at least one instance from the plurality of instances at one specific location and locations within a threshold distance.

12. The method of claim 8, wherein the plurality of location groups comprises a plurality of zip groups, wherein each zip group is associated with a specific zip code.

13. The method of claim 8, wherein generating the location list comprises determining a location group weight for each of the plurality of location groups.

14. The method of claim 13, wherein generating the location list comprises arranging the plurality of location groups based on the location group weight for each location group.

* * * * *